US009461969B2

(12) United States Patent
Watt

(10) Patent No.: US 9,461,969 B2
(45) Date of Patent: Oct. 4, 2016

(54) MIGRATION OF COMPLEX APPLICATIONS WITHIN A HYBRID CLOUD ENVIRONMENT

(71) Applicant: Racemi, Inc., Atlanta, GA (US)

(72) Inventor: Charles Thomas Watt, Atlanta, GA (US)

(73) Assignee: RACEMI, INC., Atlanta, GA (US)

( * ) Notice: Subject to any disclaimer, the term of this patent is extended or adjusted under 35 U.S.C. 154(b) by 86 days.

(21) Appl. No.: 14/504,154

(22) Filed: Oct. 1, 2014

(65) Prior Publication Data
US 2015/0096011 A1    Apr. 2, 2015

Related U.S. Application Data

(60) Provisional application No. 61/885,324, filed on Oct. 1, 2013.

(51) Int. Cl.
| | | |
|---|---|---|
| G06F 9/46 | (2006.01) | |
| G06F 9/00 | (2006.01) | |
| H04L 29/06 | (2006.01) | |
| G06F 3/06 | (2006.01) | |
| G06F 9/455 | (2006.01) | |

(52) U.S. Cl.
CPC ......... *H04L 63/0272* (2013.01); *G06F 3/0647* (2013.01); *G06F 9/45558* (2013.01)

(58) Field of Classification Search
CPC .............. G06F 3/0647; G06F 9/45558; H04L 63/0272
USPC ................................................ 718/1; 726/15
See application file for complete search history.

(56) References Cited

U.S. PATENT DOCUMENTS

| | | |
|---|---|---|
| 5,913,032 A | 6/1999 | Schwartz et al. |
| 6,662,212 B1 | 12/2003 | Chandhok et al. |
| 6,836,881 B2 | 12/2004 | Beynon et al. |
| 7,139,726 B2 | 11/2006 | Fisher et al. |
| 7,356,679 B1 | 4/2008 | Le et al. |

(Continued)

OTHER PUBLICATIONS

Taylor, M., "WebSphere MQ Primer: An Introduction to Messaging and WebSphere MQ" (Dec. 2012), IBM Redbooks, D pp. 1-64 [retrieved from www.redbooks.ibm.com/redpapers/pdfs/redp0021.pdf].

(Continued)

*Primary Examiner* — Camquy Truong
(74) *Attorney, Agent, or Firm* — Morris, Manning & Martin, LLP; John R. Harris

(57) ABSTRACT

A system and methods for the migration of complex computer applications and the workloads comprising them between physical, virtual, and cloud servers that span a hybrid cloud environment comprising private local and remote customer data centers and public cloud data centers, without modification to the applications, their operational environments, or user access procedures. A virtual network manager securely extends the subnets and VLANS within the customer's various data center across the distributed, hybrid environment using overlay networks implemented with virtual network appliances at nodes of the overlay network. A server migrater migrates individual workloads of servers used by the complex application from one pool of server resources to another. A migration manager application provides a control interface, and also maps and manages the resources of the complex application, the hybrid environment, and the virtual network spanning the hybrid cloud environment.

53 Claims, 24 Drawing Sheets

Extending an Overlay Network Between Data Centers

The Workload Migrater

(56) References Cited

U.S. PATENT DOCUMENTS

| | | |
|---|---|---|
| 7,430,740 B1 | 9/2008 | Molloy et al. |
| 7,769,720 B2 | 8/2010 | Armington |
| 8,028,191 B2 | 9/2011 | Brown et al. |
| 8,417,938 B1 | 4/2013 | Considine et al. |
| 8,452,856 B1 | 5/2013 | Lent et al. |
| 8,468,204 B2 | 6/2013 | Clarke |
| 2002/0143855 A1 | 10/2002 | Traversat et al. |
| 2003/0084106 A1 | 5/2003 | Erev et al. |
| 2003/0126202 A1 | 7/2003 | Watt |
| 2004/0199609 A1 | 10/2004 | Papatla et al. |
| 2005/0228824 A1 | 10/2005 | Gattuso et al. |
| 2005/0229175 A1 | 10/2005 | McCrory |
| 2005/0235136 A1 | 10/2005 | Barsotti et al. |
| 2006/0047763 A1 | 3/2006 | Lin |
| 2008/0163207 A1 | 7/2008 | Reumann et al. |
| 2009/0244073 A1 | 10/2009 | Uchida |
| 2010/0306380 A1 | 12/2010 | Dehaan |
| 2011/0055396 A1 | 3/2011 | Dehaan |
| 2012/0166709 A1 | 6/2012 | Chun |
| 2013/0054523 A1 | 2/2013 | Anglin et al. |
| 2013/0054530 A1 | 2/2013 | Baker et al. |
| 2013/0166504 A1 | 6/2013 | Varkhedi |
| 2013/0166923 A1 | 6/2013 | Tsuhara |
| 2013/0179548 A1 | 7/2013 | Singh et al. |
| 2013/0198354 A1 | 8/2013 | Jones et al. |
| 2013/0254520 A1 | 9/2013 | Birnkrant et al. |
| 2013/0282887 A1 | 10/2013 | Terayama et al. |
| 2013/0332588 A1 | 12/2013 | Maytal et al. |
| 2014/0143773 A1* | 5/2014 | Ciano ............... G06F 9/45533 718/1 |
| 2015/0074743 A1* | 3/2015 | Ilieva ................. H04L 63/10 726/1 |

OTHER PUBLICATIONS

"WebMail: Maiiboxes." CommuniGate Pro WebUser Interface: Mailboxes. Stalker Software, Inc., Jun. 18, 2006. Web. Apr. 17, 2015. <https :1 lwww .commu n igate.com/commu n igatepro/ WebMai l box. html>.

"Mailbox HBase." Mailbox HBase. The Apache Sofware Foundation, Dec. 18, 2011. Web. Apr. 16, 2015. <http://james.apache.org/mailbox/mailbox-hbase.html>.

"Permissions for Files and Folders." Permisson for Files and Folders: User Rights; Security Policy; Security Services. Microsoft, Jan. 21, 2005. Web. Apr. 16, 2015. <https:l/technet.microsoft.com/en-us/library/cc787794(v=ws.10).aspx>.

* cited by examiner

System to Automate Migration of Complex Applications within a Hybrid Cloud Environment

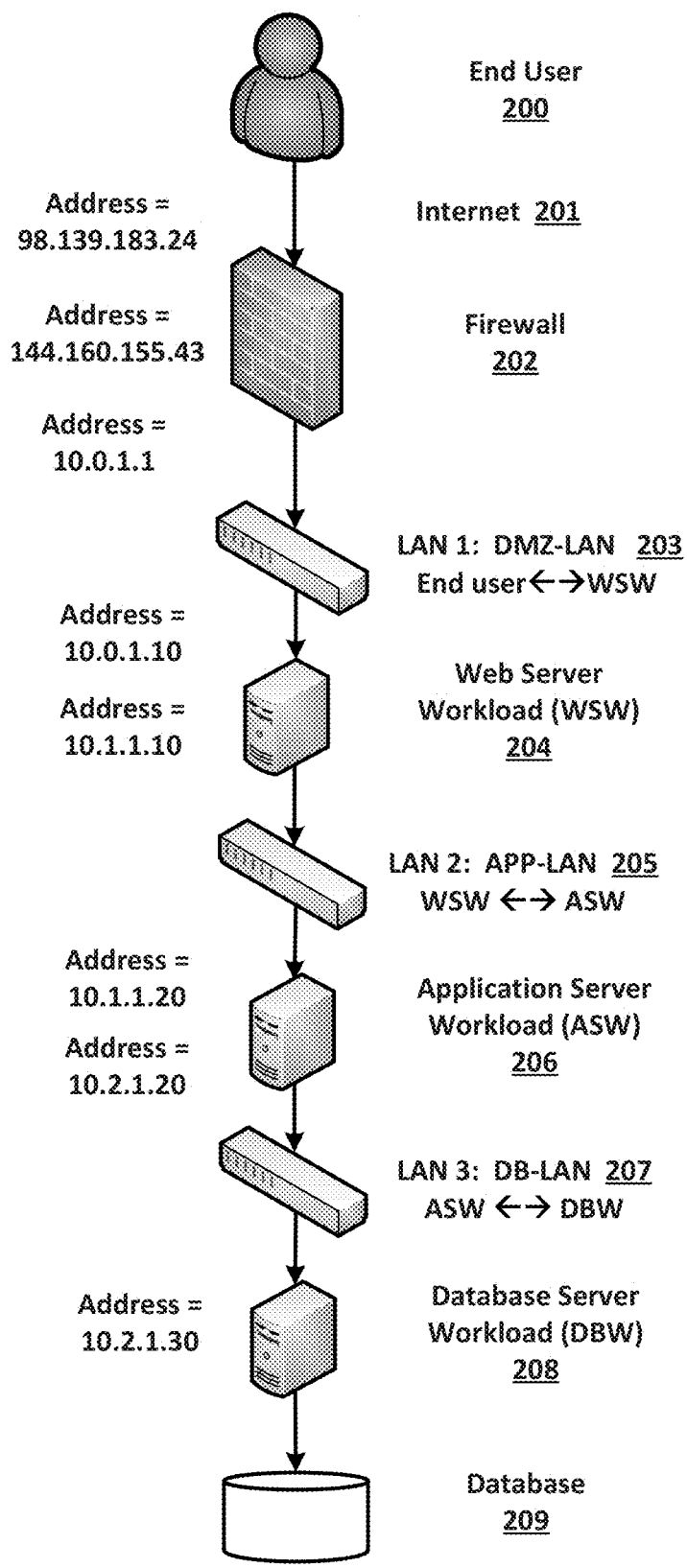
FIG. 2: A Typical Complex Application

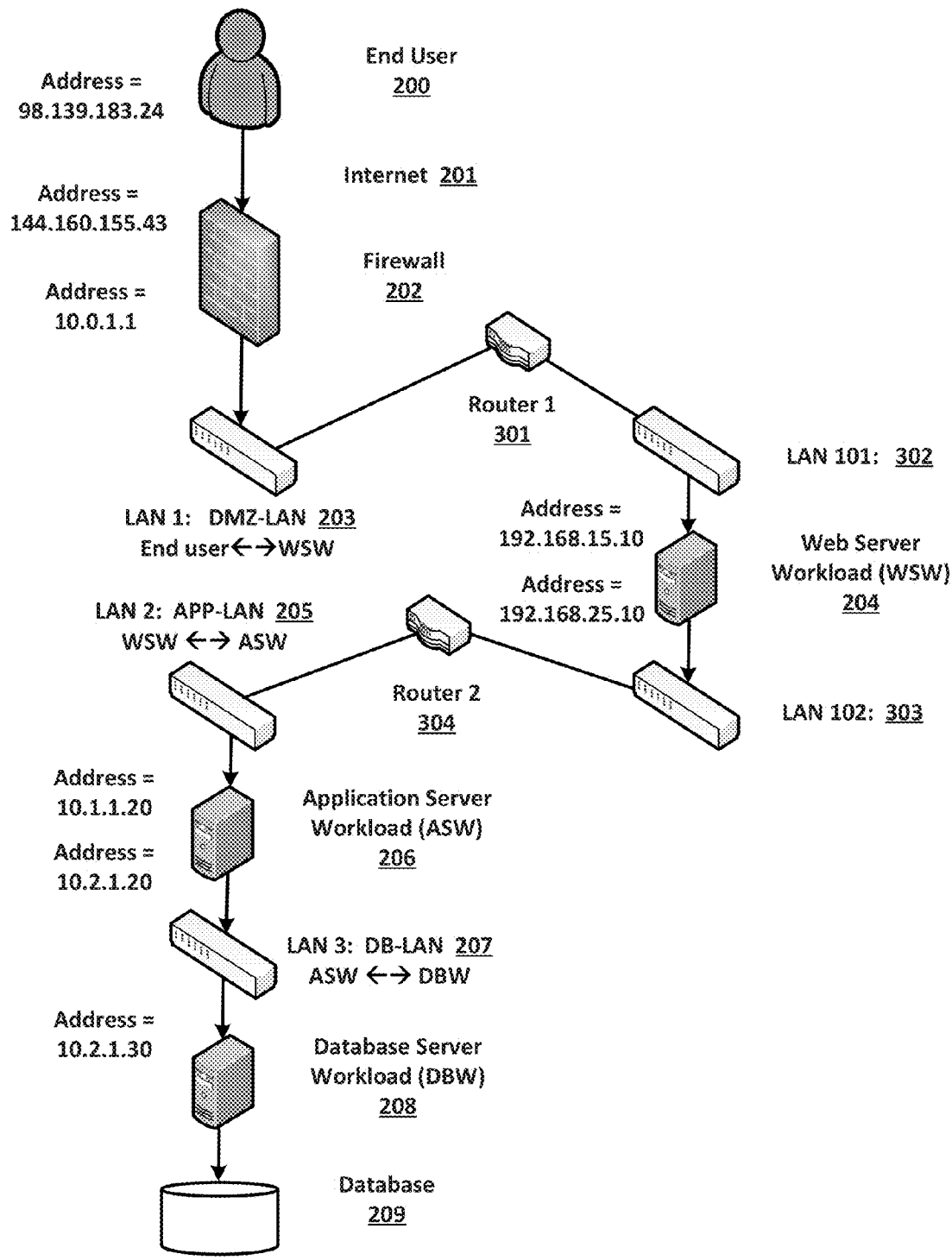
FIG. 3 Moving One Server in a Complex Application Can Break Network Connections

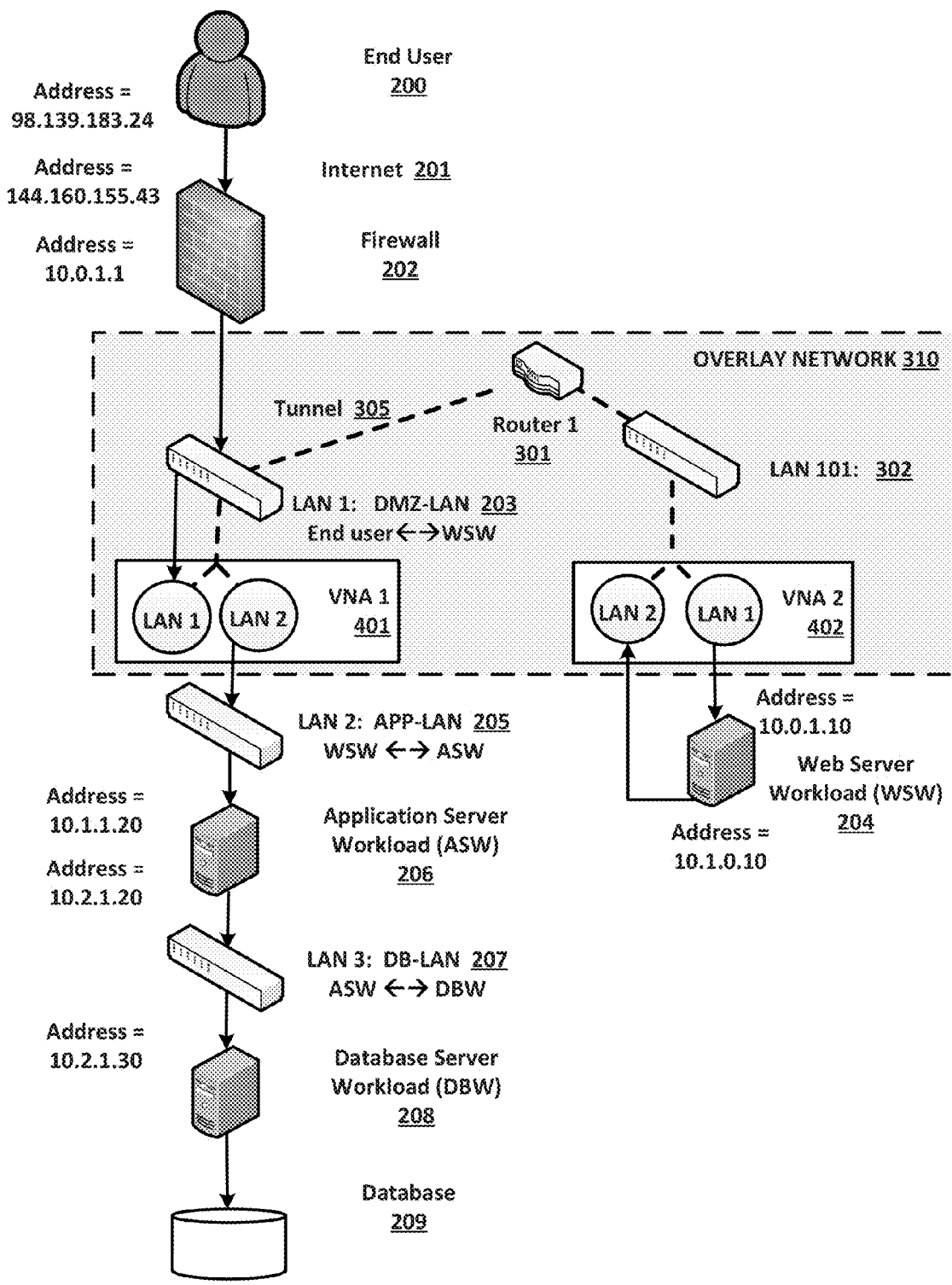
FIG. 4A Using Overlay Networks to Eliminate Broken Network Connections

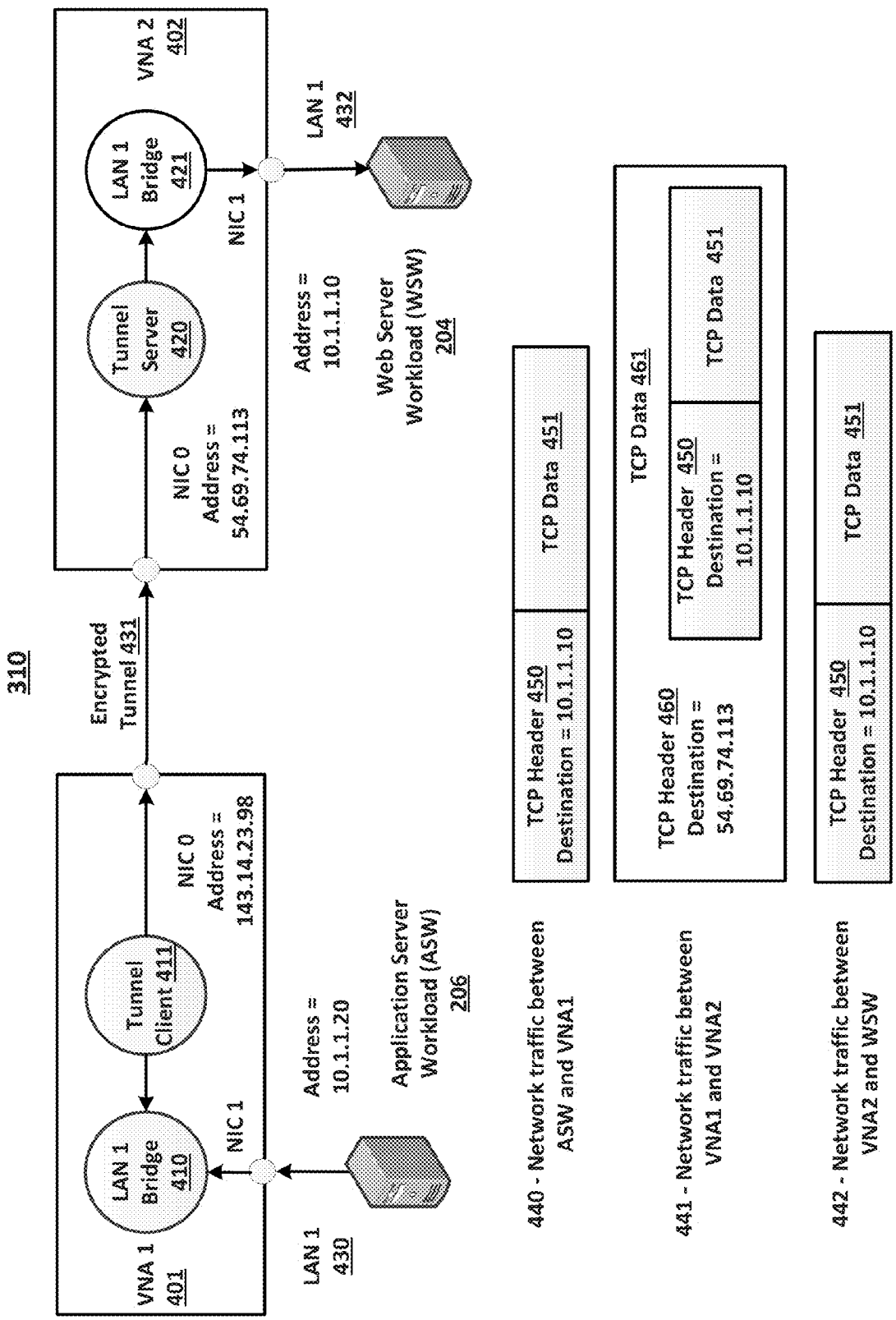
FIG. 4B: Overlay Network Details

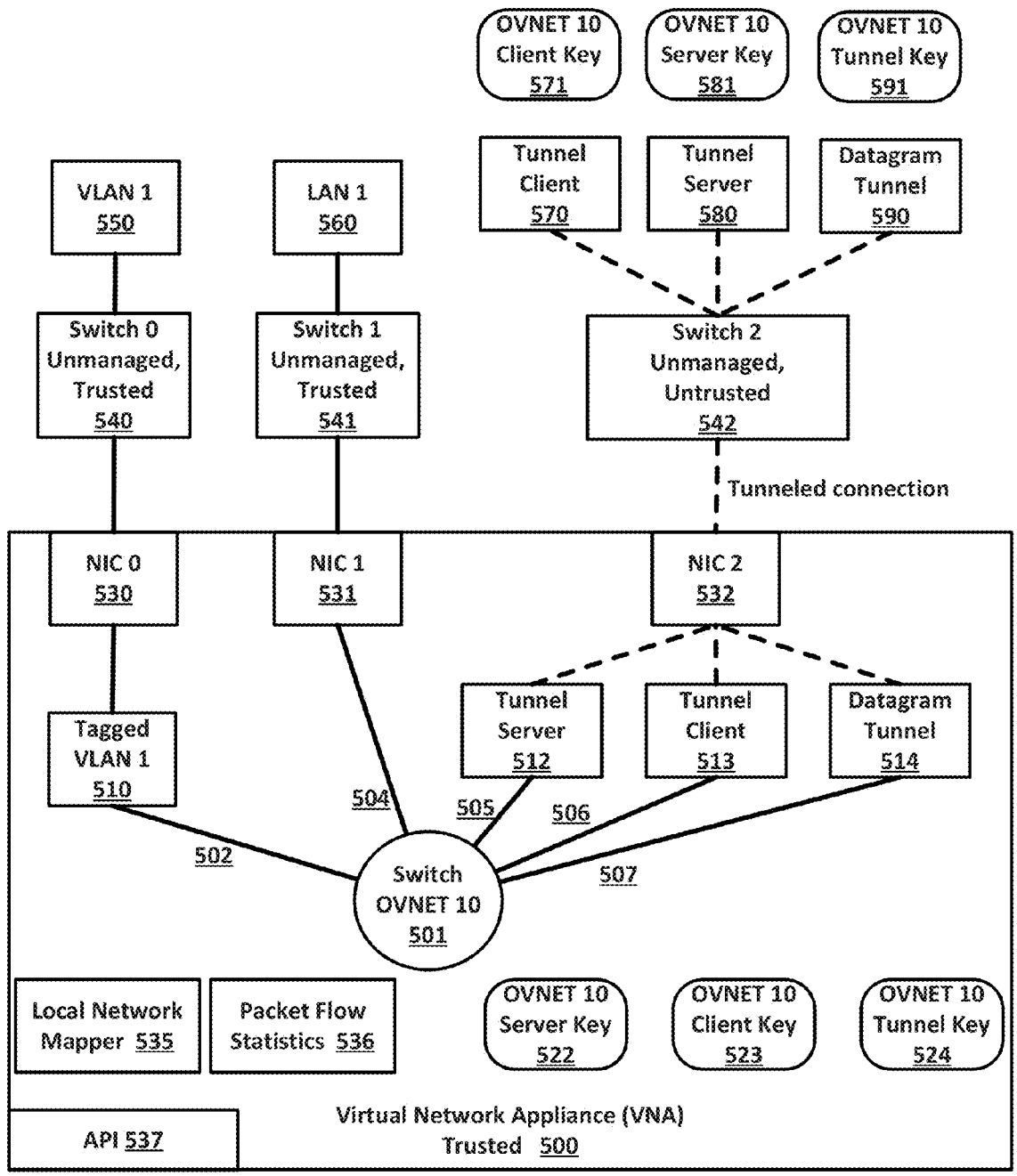
FIG. 5: Creating Overlay Networks

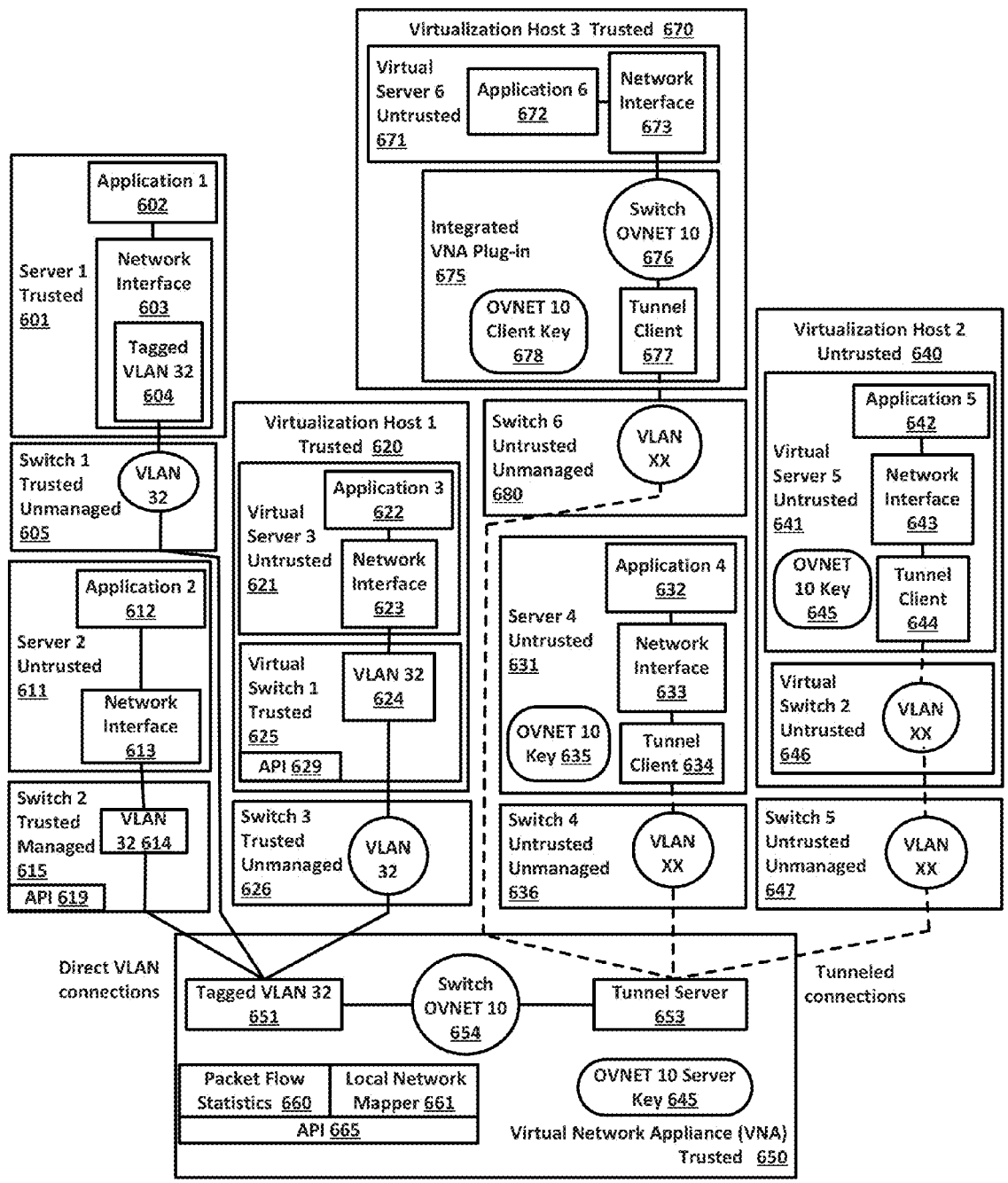
FIG. 6: Configuring a Server's Overlay Network Connection

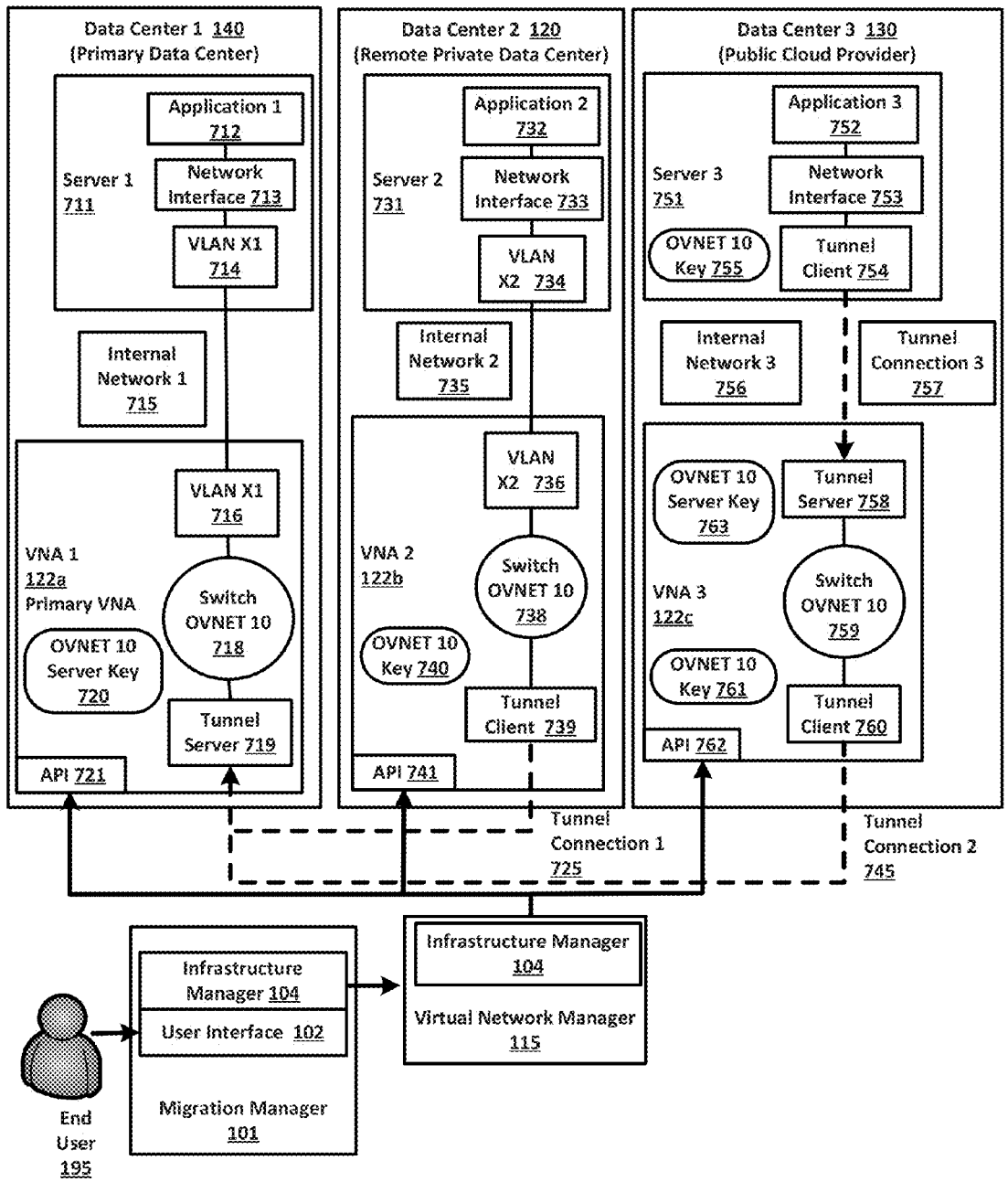
FIG. 7: Extending an Overlay Network Between Data Centers

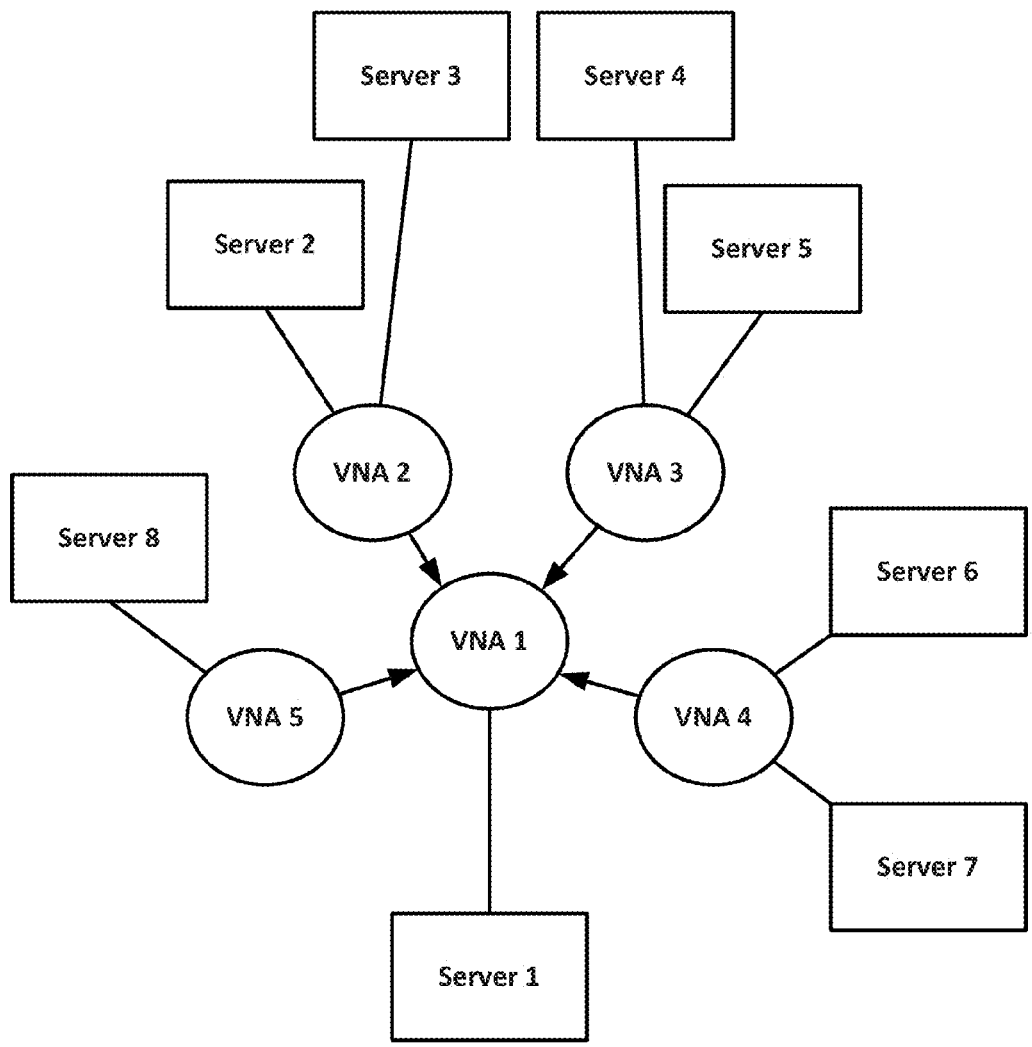
Star Network Topology 850
FIG. 8A: Virtual Network Topologies

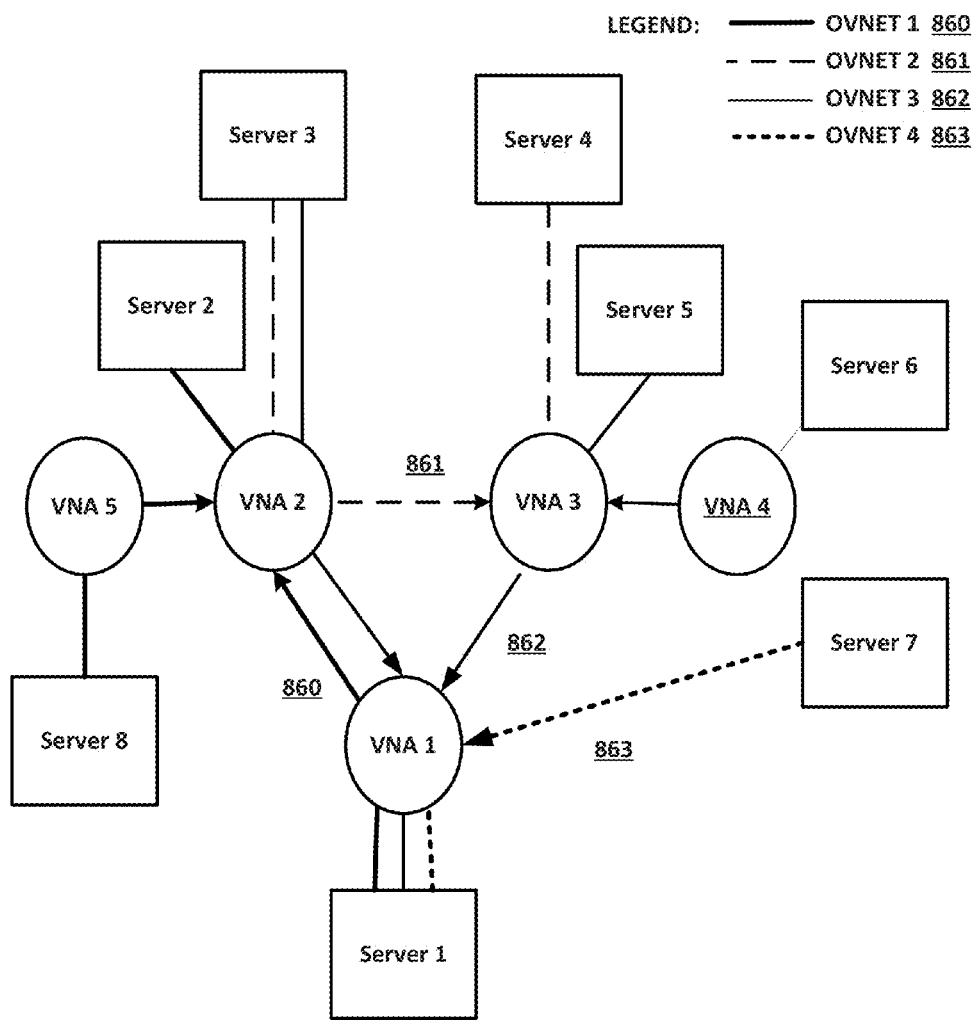
FIG. 8B: Virtual Network Topologies

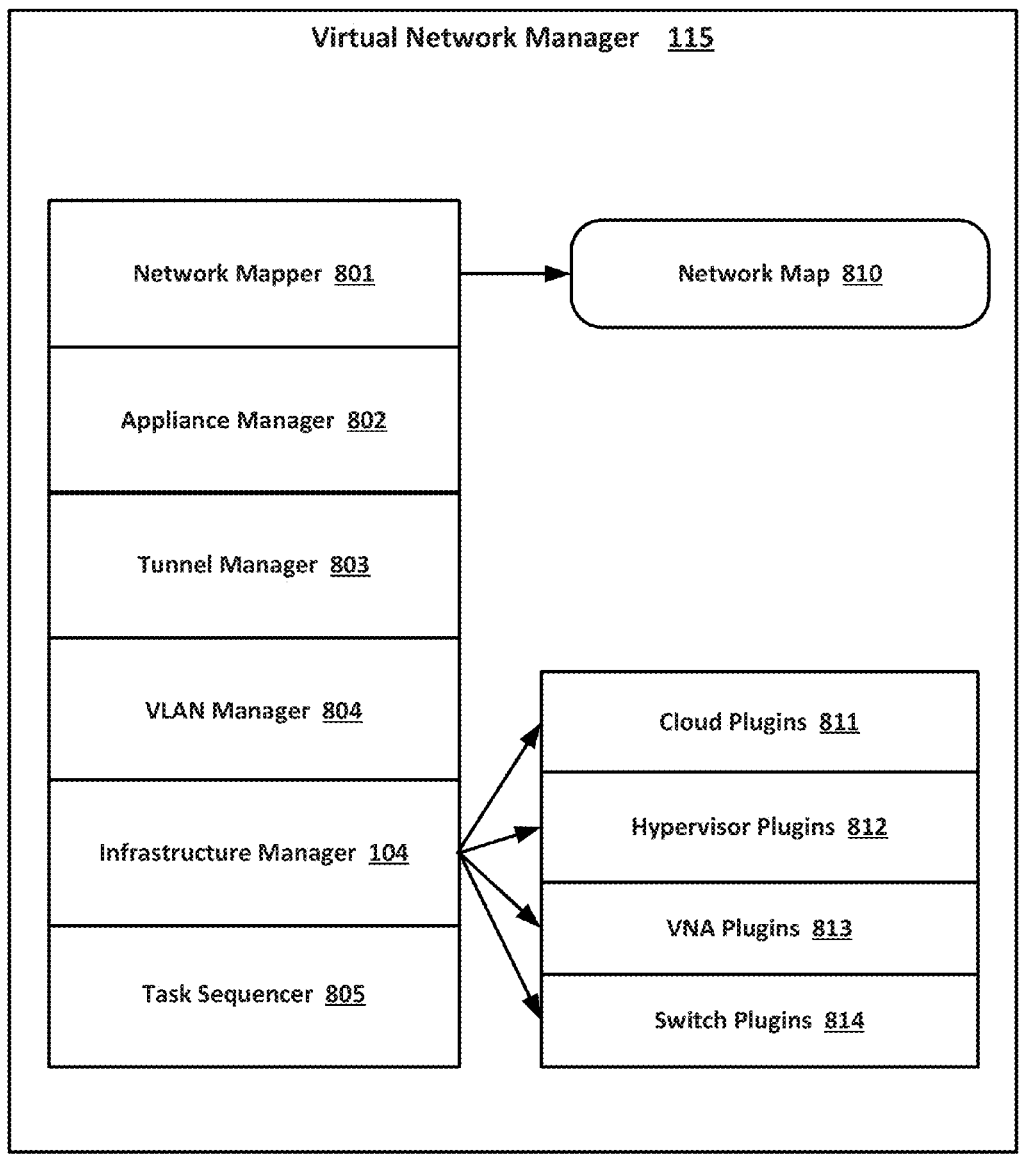
Figure 8C: The Virtual Network Manager

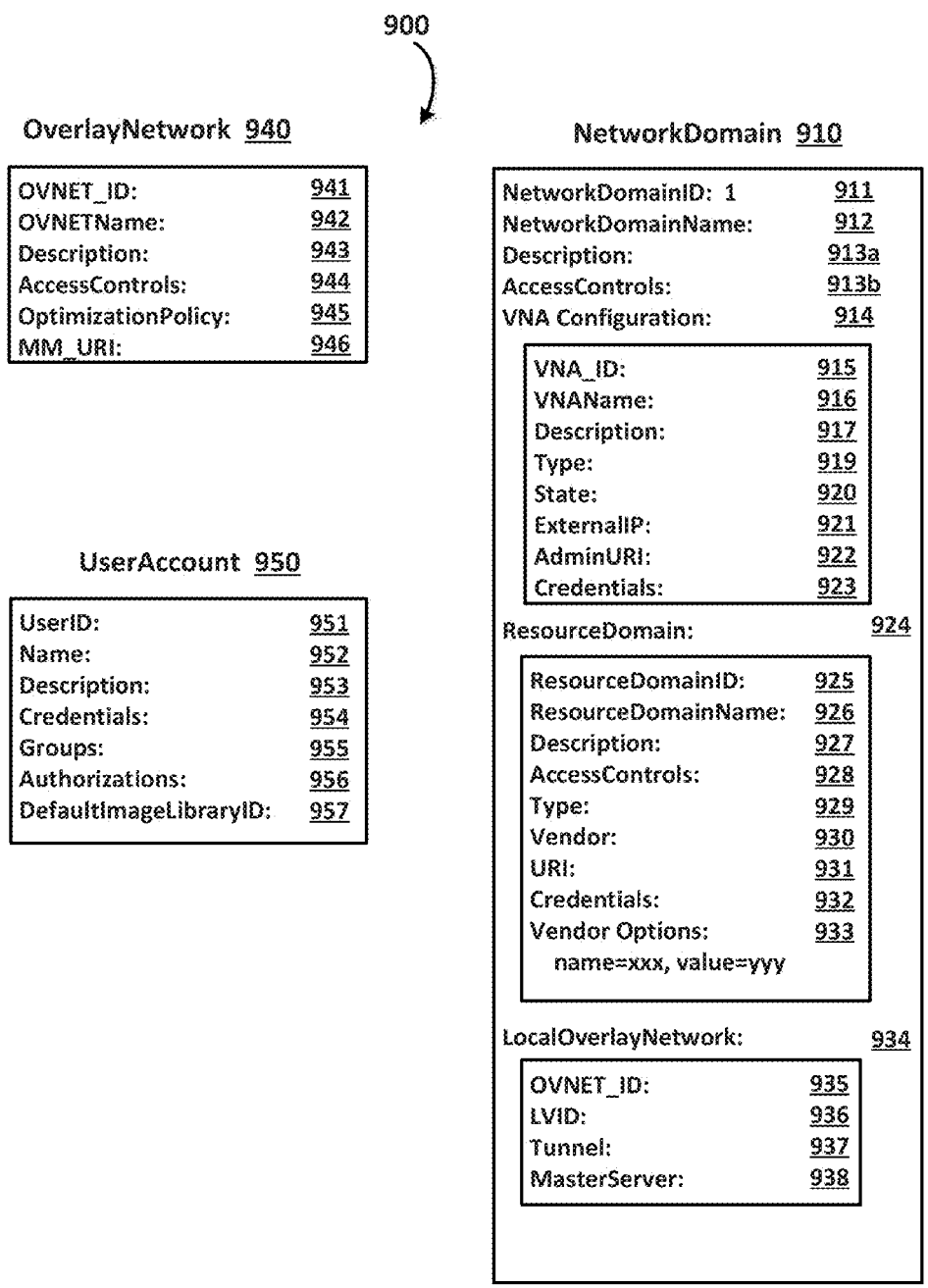
FIG. 9: The Network Map

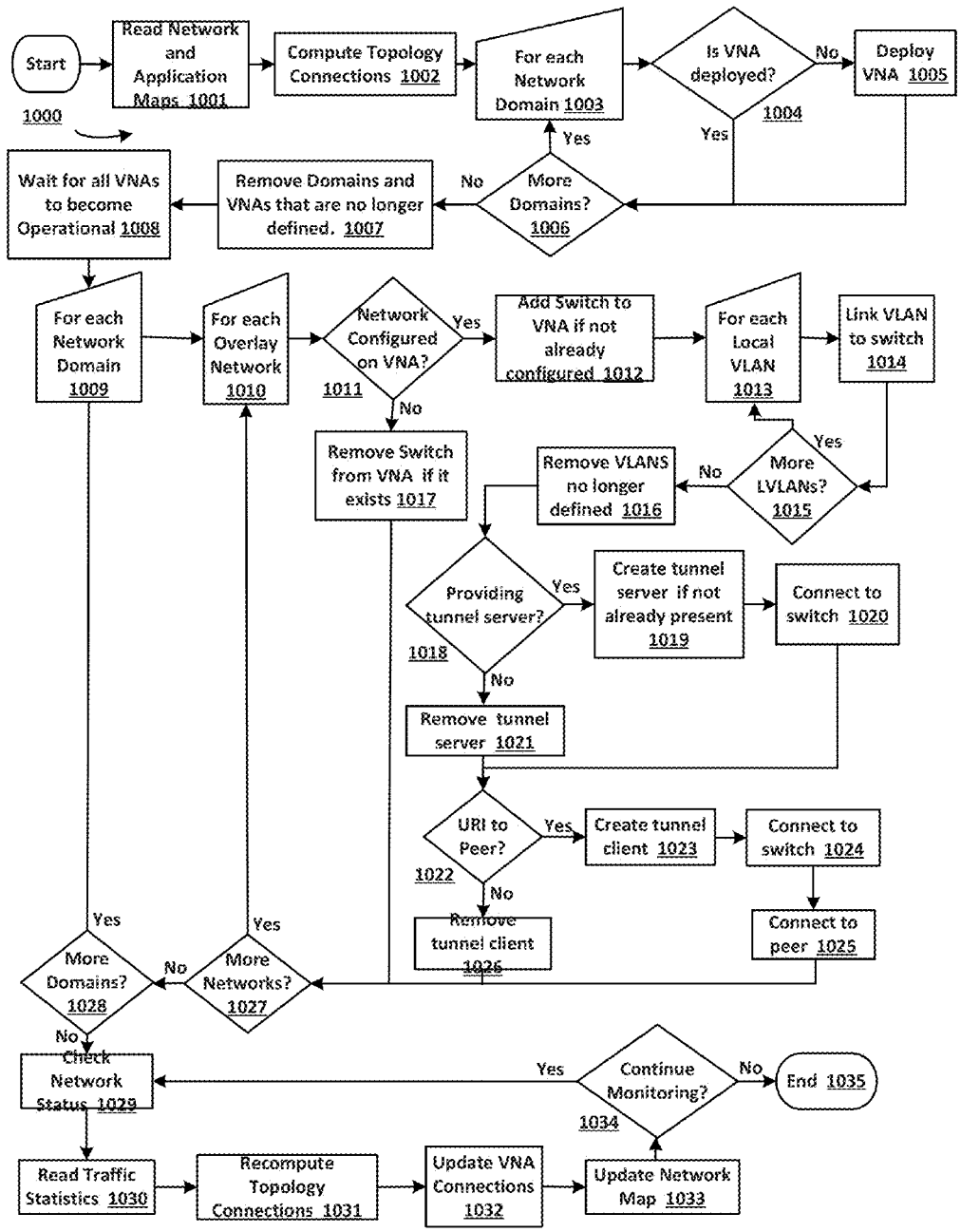
FIG. 10: Deploying the Virtual Network

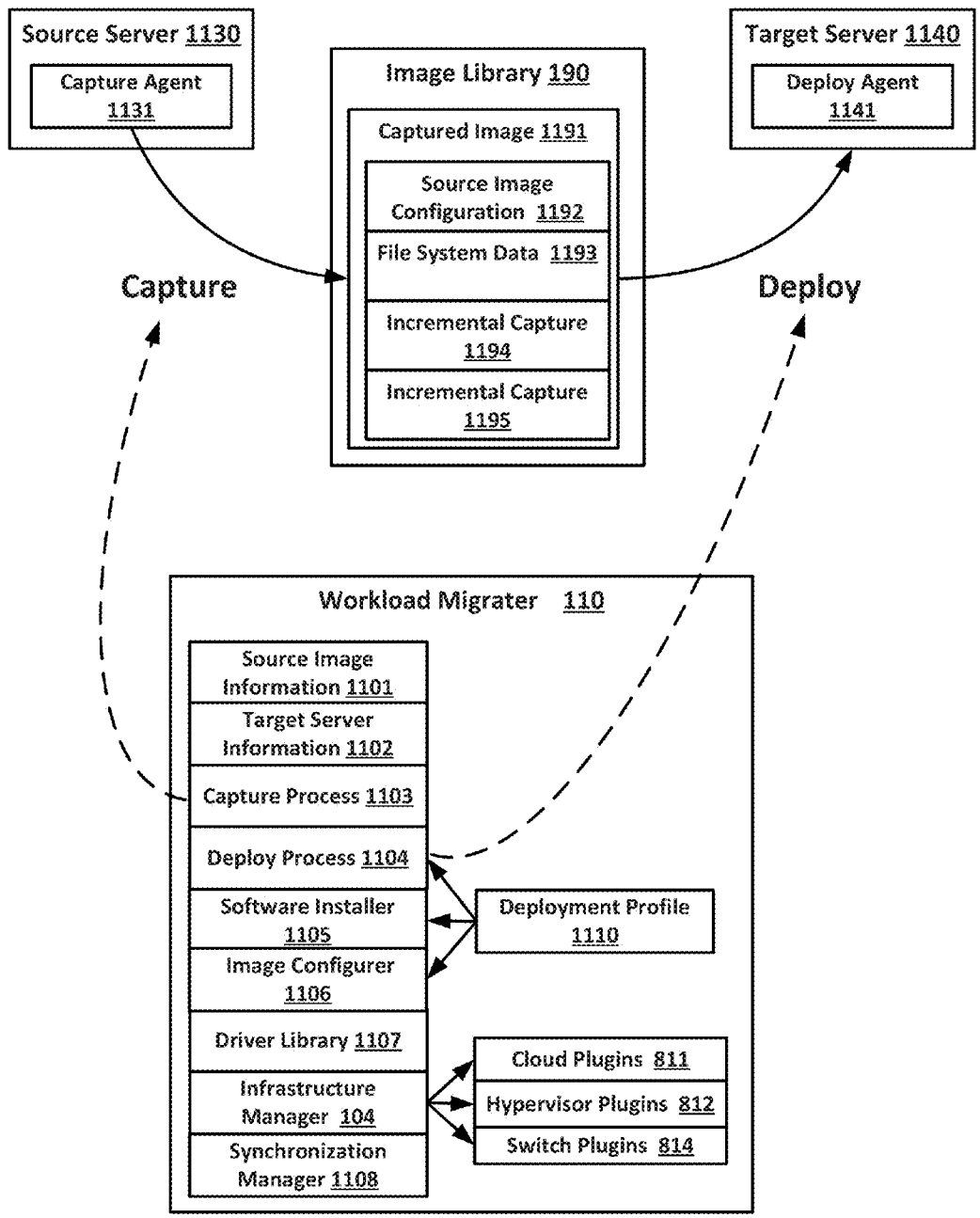
FIG. 11: The Workload Migrater

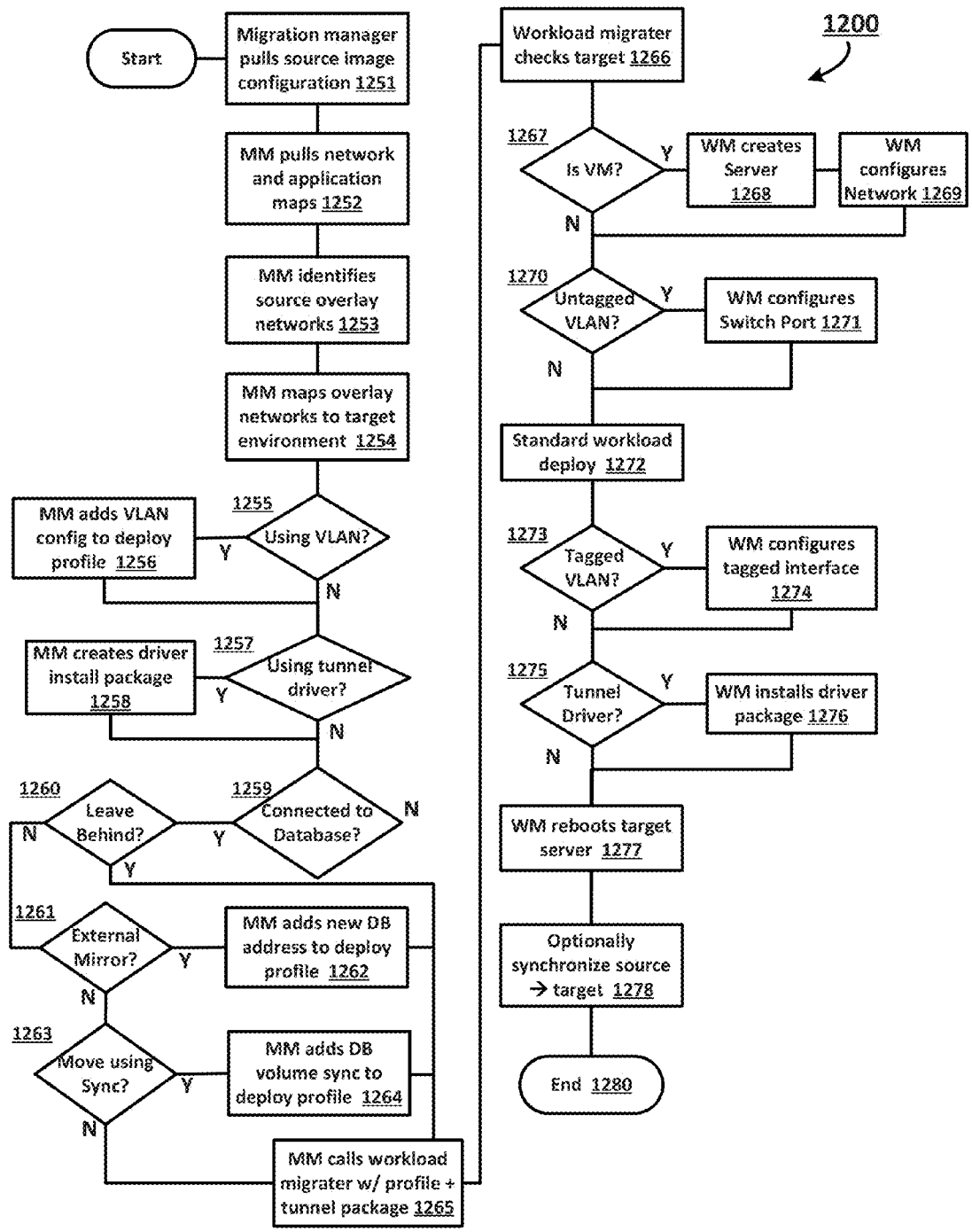
FIG. 12: The Workload Deployment (for Migration Manager 101) Process

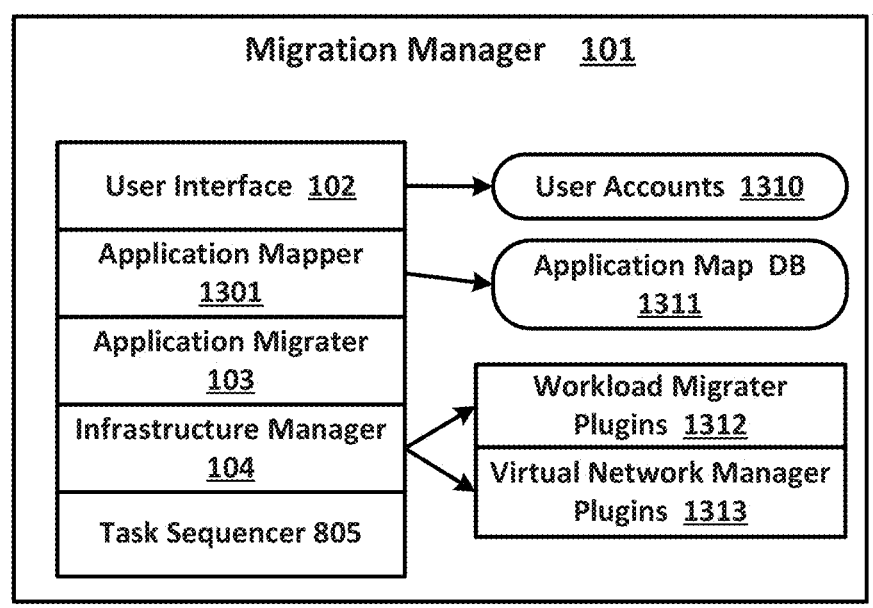
FIG. 13: The Migration Manager

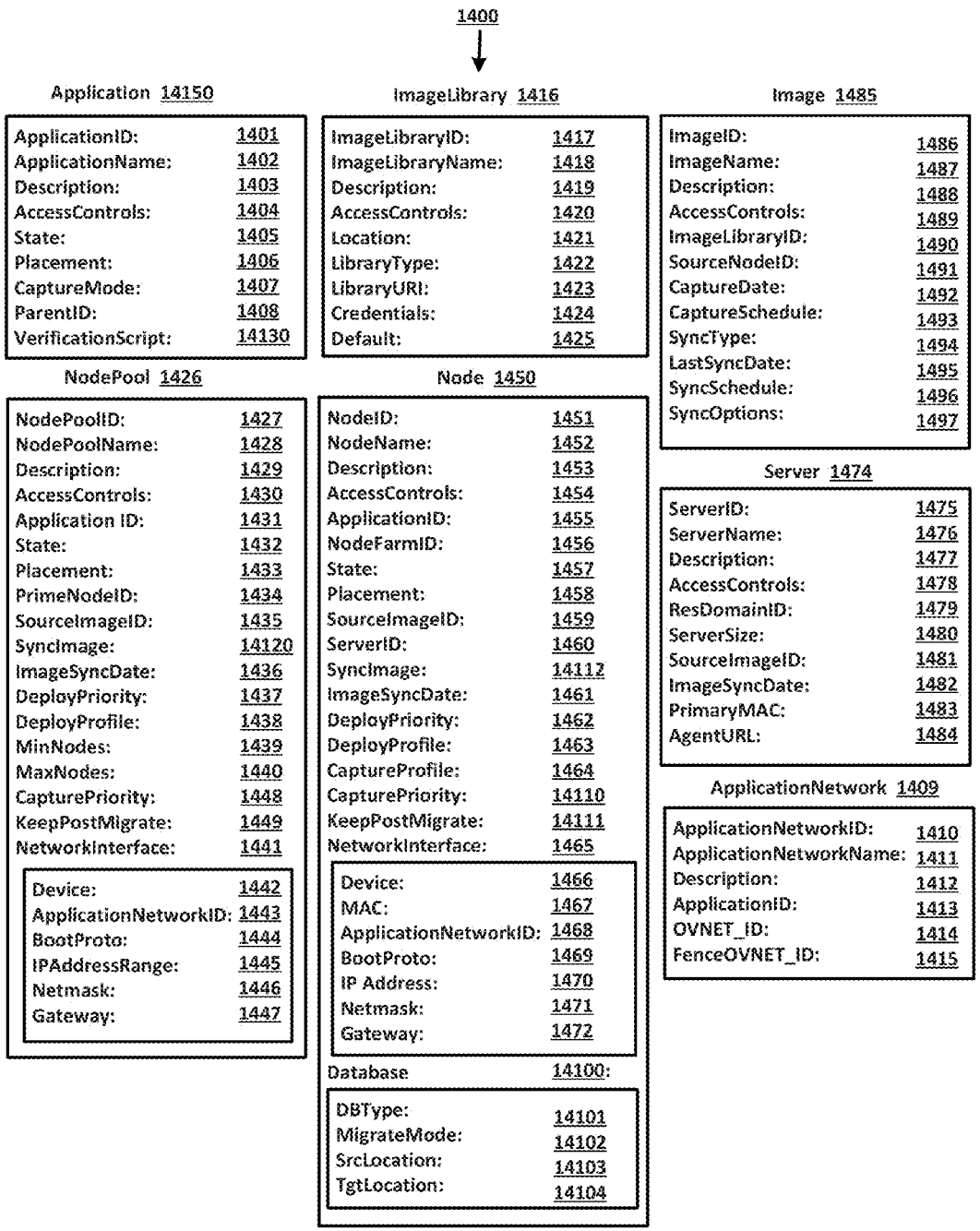
FIG. 14: The Application Map

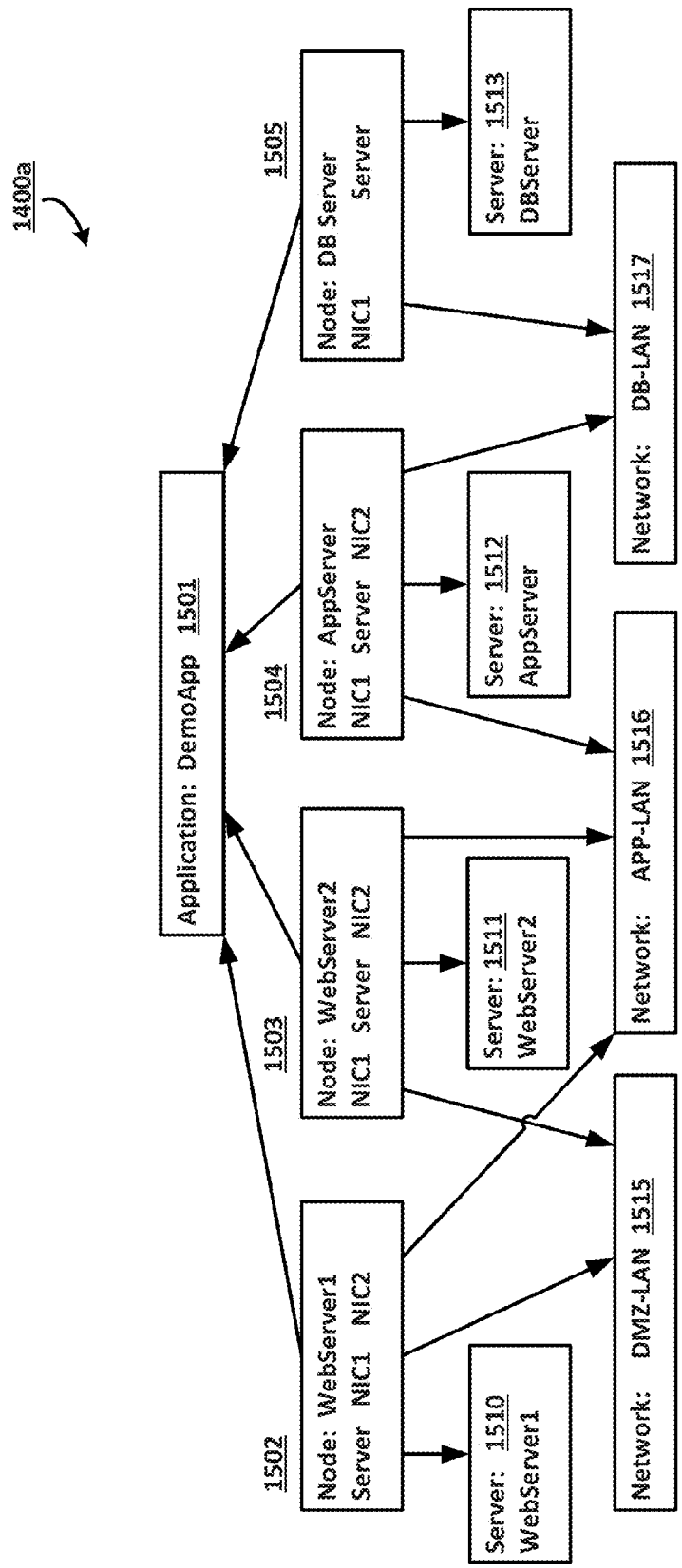
FIG. 15A: Application Map as Discovered by Application Mapper

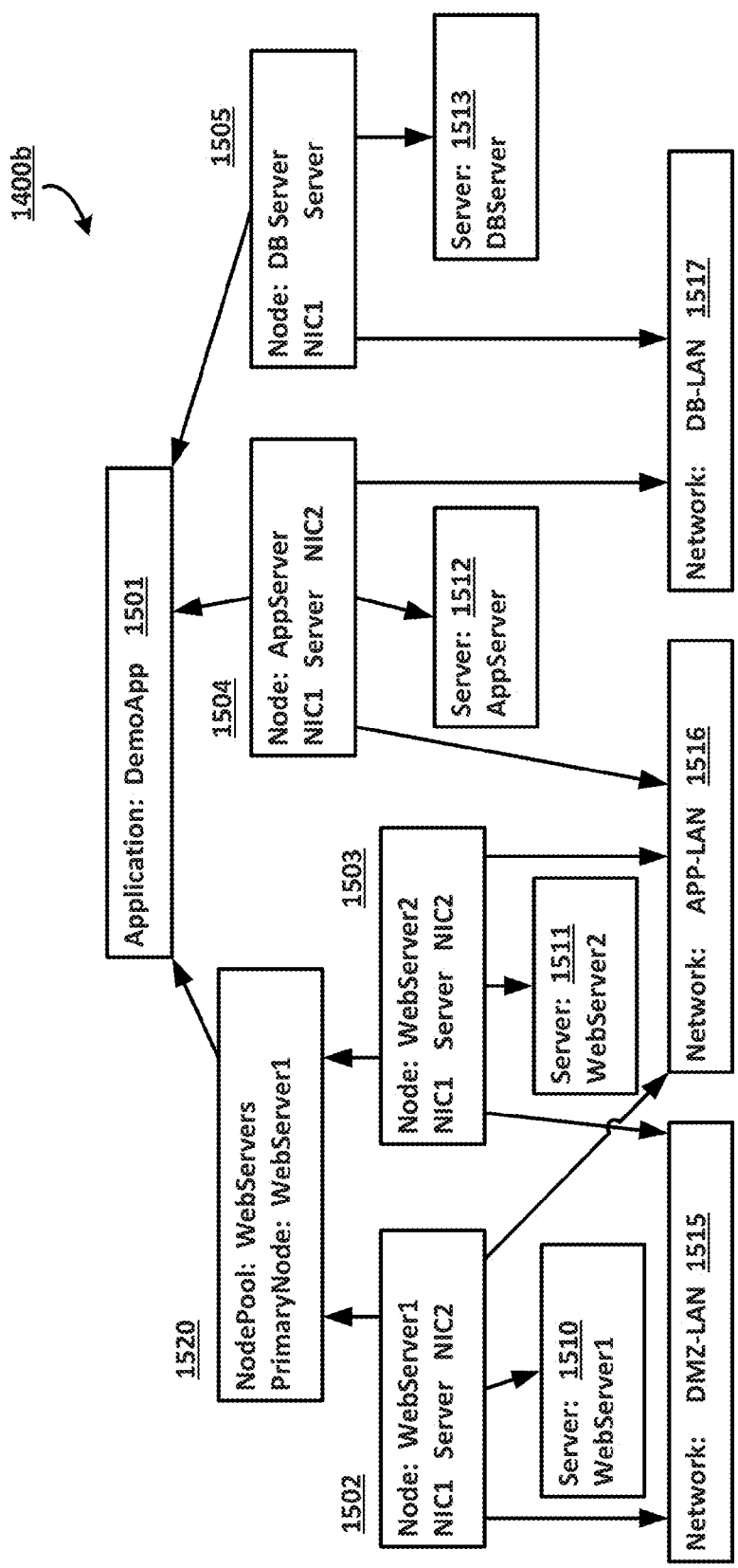
FIG. 15B: Application Map Using Node Pool

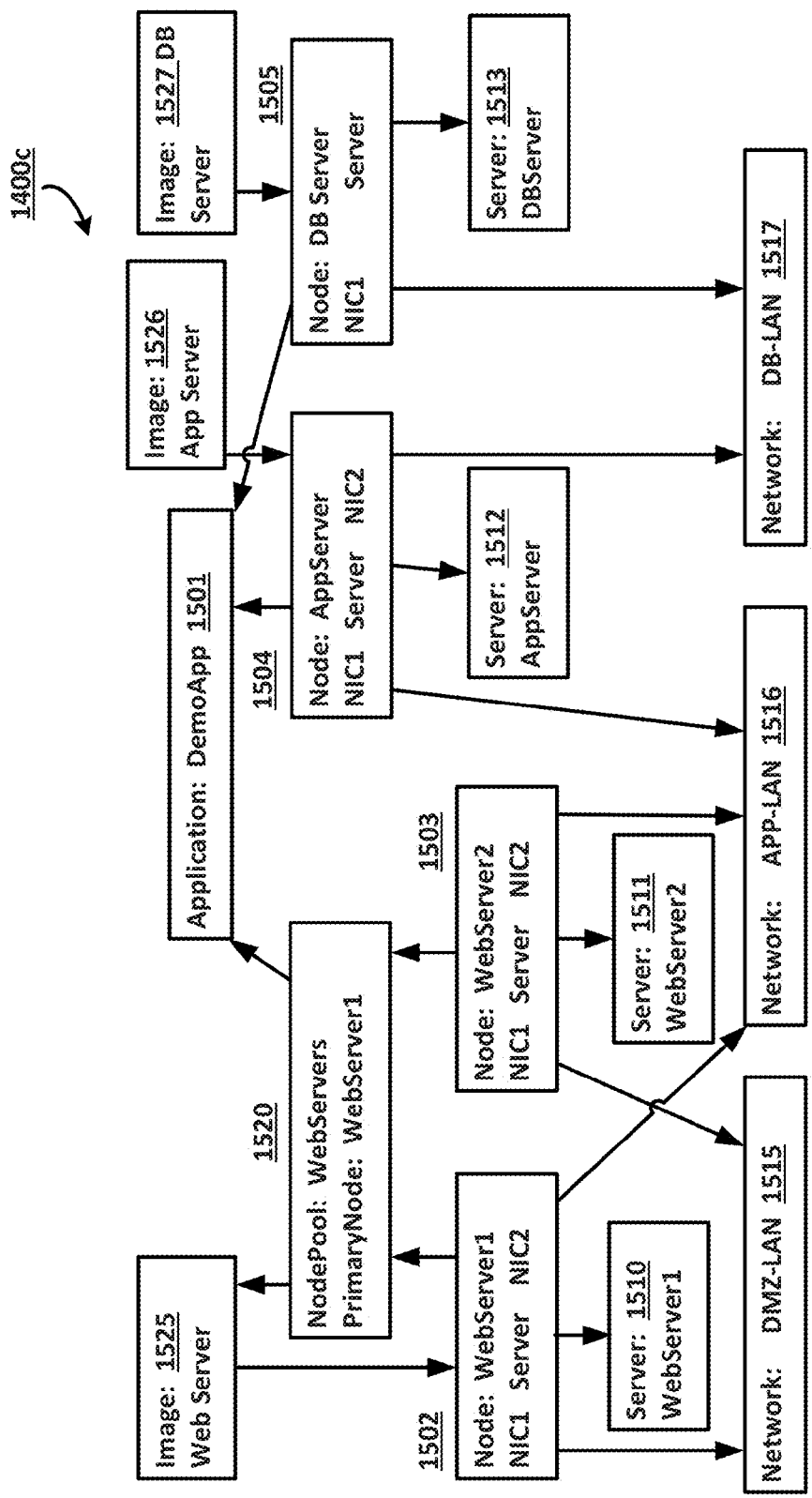
FIG. 15C: Application Map after Application Capture

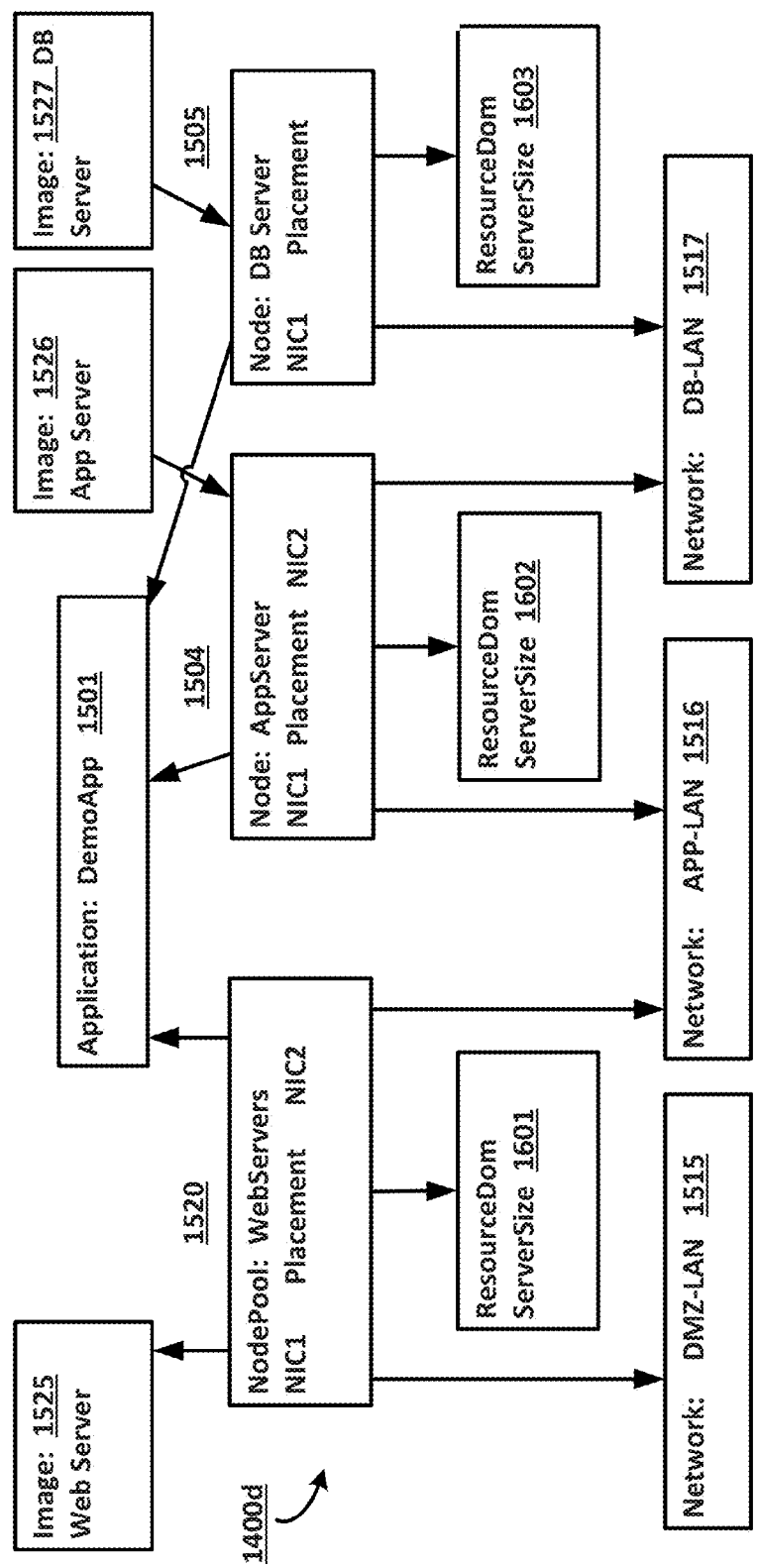
FIG. 16A: Application Map Converted to Template

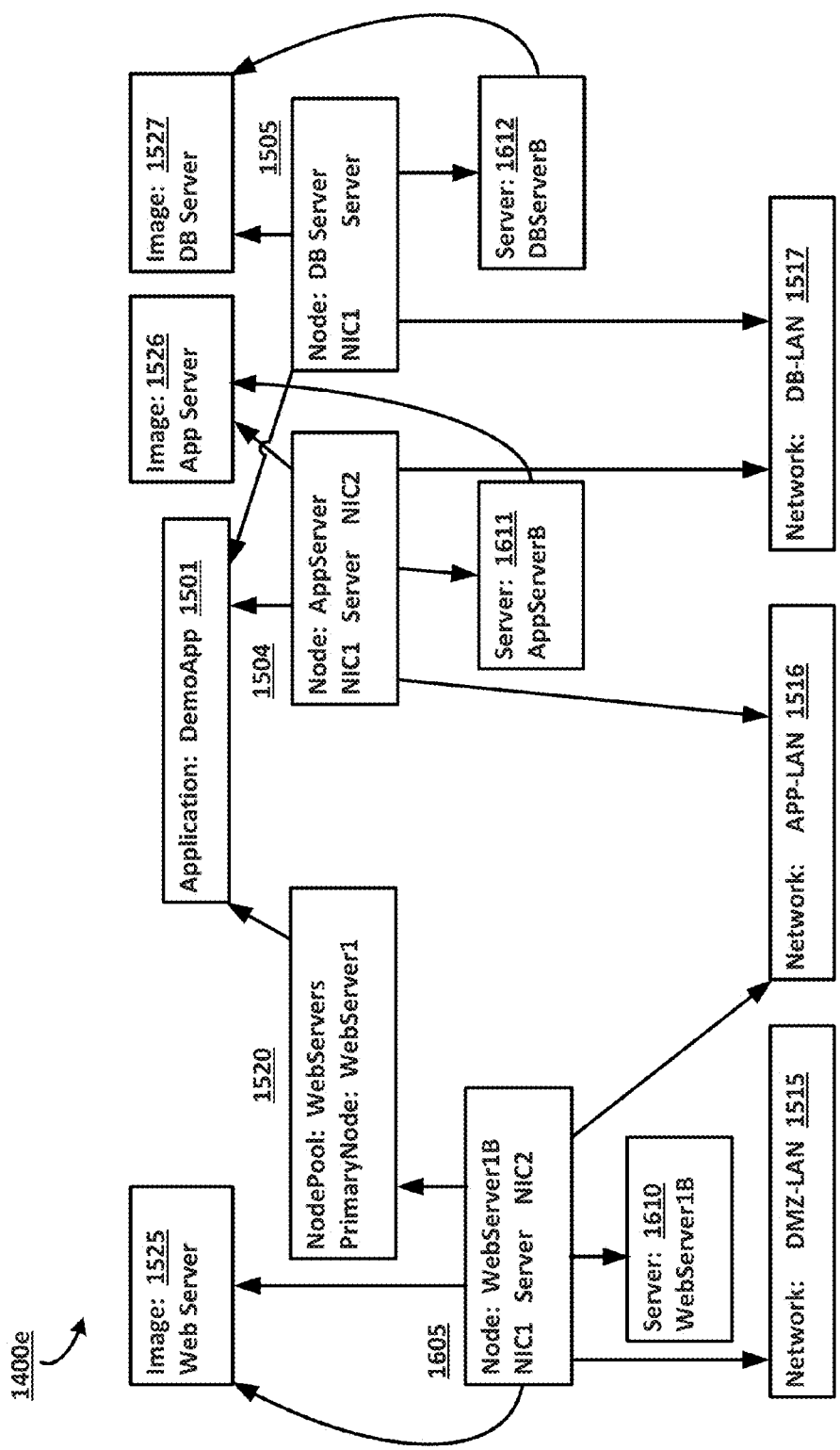
FIG. 16B: Application Map after Deploying from Template

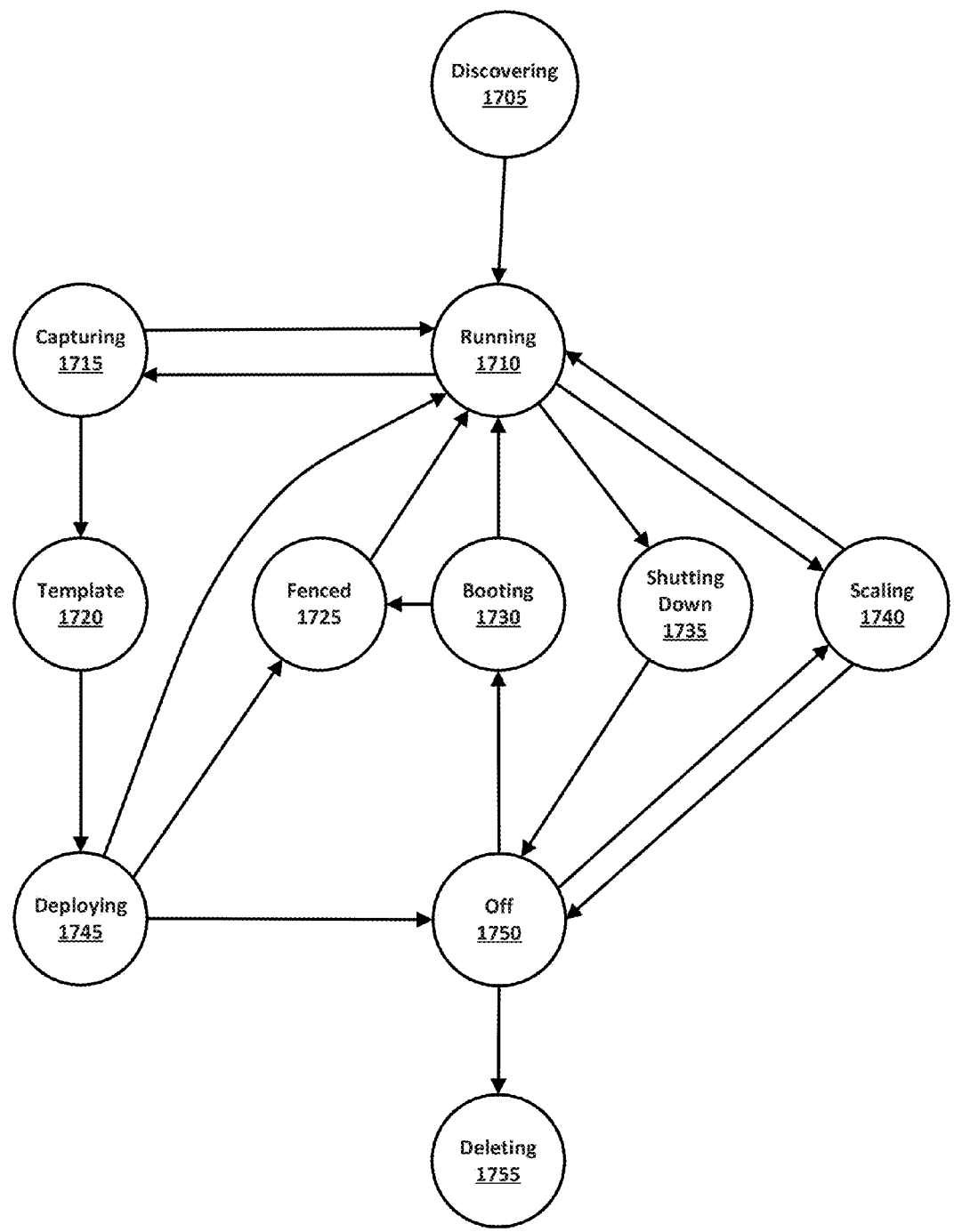
FIG. 17: The Application State Diagram

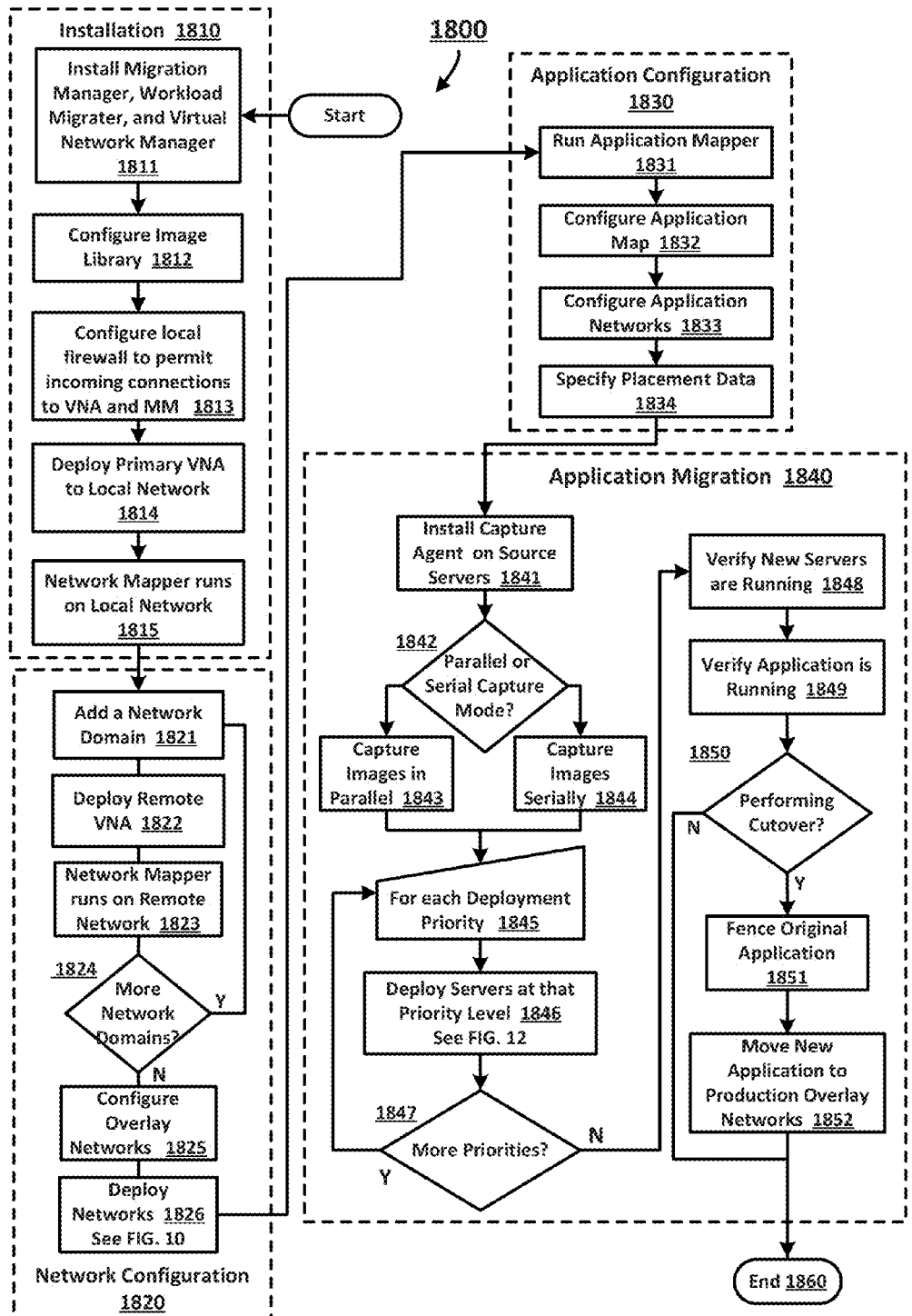
FIG. 18: The Application Migration Process

MIGRATION OF COMPLEX APPLICATIONS WITHIN A HYBRID CLOUD ENVIRONMENT

CROSS-REFERENCE TO RELATED APPLICATION

This application claims the benefit under 35 U.S.C. §119(e) of U.S. Provisional Patent Application No. 61/885,324, filed Oct. 1, 2013, entitled "Migration of Complex Applications Within a Hybrid Cloud Environment," incorporated herein by reference in its entirety.

TECHNICAL FIELD

The present disclosure relates to complex computer applications that consist of a plurality of communicating workloads, and the methods and apparatuses for migrating them between physical, virtual, private cloud, and public cloud servers.

BACKGROUND

A "server image" is the logical embodiment of a server computer (a/k/a a "server") that contains all of the programs and data needed to provide one or more services by the server computer to its client computers, typically including (but not limited to) a kernel and operating system, device drivers (that are normally associated with the hardware-related components of the server running the image), application software and data, and configuration settings, including those associated with the network and storage environments surrounding the server. A "workload" is the embodiment of a single server running an image. The image can run on a dedicated physical server, in which case the workload will have direct access to all of the server's available resources. Or the image can run on a virtual server provided by a hypervisor host (e.g., VMware ESX or Citrix XenServer) or public cloud infrastructure (e.g., Amazon EC2, Rackspace), in which case the hypervisor or cloud infrastructure regulates access to a pool of resources that are shared between all its virtual servers.

Many computer servers are now being provided in "hybrid cloud environments." A hybrid cloud environment is a combination of computer servers provided in private data centers and in public clouds such as provided by Amazon EC2, Rackspace, and other entities that provide computing services and communications for a wide variety of customers and applications. A hybrid cloud environment offers varied opportunities to implement workloads on servers through selection of computers, computing services, data storage, application hosting, localized and remote data centers, and other computing functions.

There are many factors to consider when choosing a server to run a workload including performance, cost, security, robustness of the infrastructure, geographic location, etc. Over time the optimal server for a workload might change due to changes in the workload's life cycle (development, test, production, etc.), the number of clients accessing the workload, the availability of more efficient physical resources, or the need to change its geographical location. Over its life time, the total cost of ownership for a workload would be minimized if there were a way to migrate it such that it was always running on the most cost-effective resource that met its current needs.

Migrating a workload from one server to another can be a difficult task, and is more difficult in a hybrid cloud environment. While running on the original source server, the image is configured for the hardware (real or virtual) provided by that server and the network and storage environments surrounding that server. After migration the new server might differ in regard to hardware or environmental configuration such that simply copying the image from the source to the target does not result in a functional workload. United States Patent Application Publication No. US 2013/0290542 "Server Image Migrations into Public and Private Cloud Infrastructures" (Charles T. Watt, et. al.) discusses the issues associated with server image migration and discloses methods and apparatuses for migrating a single server image between physical, virtual and cloud servers. These methods provide great benefit for applications that can be implemented within a single workload, but they can fail when migrating complex computer applications.

"Complex computer applications," as the term is used herein, are applications that require multiple computer programs, often on different computers (physical or virtual) that communicate with each other in a networked arrangement (such as a local area network or within a data center) to exchange data and provide services, and sometimes with other, external computers in a broader networked arrangement (such as the Internet). Complex applications are often implemented using multiple workloads, each providing a service that is accessible to the other workloads via a network connection. FIG. 2 shows an example of a typical Internet complex computer application. In the example application, an end user 200 accesses the application using a web browser, which connects to a web server workload (WSW) 204 via a firewall 202. The WSW connects to an application server workload (ASW) 206 to access any application logic. The ASW connects to a database workload (DBW) 208 to store or retrieve any application data. To provide secure isolation of the workloads, the communications between the workloads occur on separate local area networks (LANs), either physical LANs or virtual LANs (VLAN). The connection between the end user and the firewall occurs over the Internet 201. The connection between the firewall and the WSW occurs over LAN 1 203. The connection between the WSW and the ASW occurs over LAN 2 205. And the connection between the ASW and the DBW occurs over LAN 3 207. Either or any of LAN 1, LAN 2, or LAN 3 could be a VLAN. To facilitate routing in this environment, each LAN uses a separate subnet. Thus, the WSW and ASW are each configured with two network addresses—one for each subnet to which the workload connects. Each workload is configured to communicate with peer services using the visible network address of the peer. In the example, the WSW 204 accesses the ASW 206 by connecting to IP address 10.1.1.20.

When migrating one or more workloads of a complex application onto new resources, it is often not possible to replicate the original VLANs, subnets, and addresses in the new environment. For example, the cloud servers provided by many public cloud vendors come with just a single network interface and a single network address that is arbitrarily specified by the vendor based upon the specific internal details of the cloud's infrastructure. After migrating one or more servers into such an environment, the complex application will no longer function because the individual workloads will still be configured for the original network addresses. This problem is illustrated in FIG. 3, where the WSW 204 has been migrated into a new environment. Its network interfaces are now on LANs 101 302 and 102 303. If the WSW keeps its original network addresses, there will be no way to route connections back to its original LAN 1 203 and LAN 2 205. To restore the application, the WSW will need to be reconfigured to use new IP addresses that work on its new subnets, and it will need its routing set to access LANs 1 and 2. Even though they haven't moved, the firewall and AWS will also need to be reconfigured in order to access the WSW using its new addresses, and might need to add route table entries pointing to LANs 101 and 102.

In practice, the number of workloads comprising a complex application can be quite large. The task of reconfiguring all the workloads after migration can be quite time consuming and expensive, and sometimes even impossible if the relevant knowledge is no longer available on how to reconfigure the application. Worse yet, the full set of workloads comprising the application might not be known. Many common services such as authentication, directory, and file storage are often not associated with an application because they are shared with other applications and considered common infrastructure. But if the complex application is migrated into another environment that does not have access to these ancillary services, it will not function correctly.

An "overlay network" uses software that sits on top of a shared network infrastructure to transparently link portions of that shared infrastructure into an isolated, secure, functional LAN. An overlay network is a computer network that is a separate network entity, either physical or virtual, built "on top" of another network, such as the Internet. For example, a company's virtual private network (VPN), which has nodes within multiple physical facilities connected by a public network such as the Internet, is a form of overlay network since users on the VPN are transparently connected to each other. Overlay networks are often used to provide multi-tenant use of a shared network infrastructure. They are also used to extend a LAN across multiple network infrastructures.

FIG. 4A shows how an exemplary overlay network 310 can be used with the example application to keep the WSW connected to its original LANs after migration. FIG. 4A adds two virtual network appliances (VNA), VNA 1 401 and VNA 2 402, to FIG. 3. The appliances are linked via a layer 3 network connection or tunnel 305 that they use to tunnel layer 2 traffic between them. Each appliance (VNA) acts like a network switch within its environment, passing traffic between the tunnel and its local LAN to create an overlay network 310 linking the migrated WSW 204 back into LANs 1 and 2 such that it can retain its original network addresses. The overlay network 310 is completely transparent to the workloads and the other network components. To the complex application it appears as if nothing has changed and the WSW 204 is still directly connected to LANs 1 and 2. Thus, the complex application continues to function without modification to the application itself, any of the individual workloads, their operational environments, or user access procedures.

Further details about aspects of the exemplary overlay network 310 and operations thereof can be found below in connection with the discussion of FIG. 4B.

For the foregoing and other reasons, it is difficult and time-consuming to migrate such complex applications within data centers and public cloud data centers, even for skilled computer and information technology (IT) workers. What is needed is a solution that creates a hybrid cloud environment out of the physical, virtual, and cloud servers and associated network resources in a plurality of private data centers and a plurality of public cloud data centers, and allows efficient migration of complex applications to different computing resources within the hybrid cloud environment as new and better computing resources are brought to market.

SUMMARY OF THE DISCLOSURE

According to one aspect, there is disclosed an improved methods and system for migrating complex applications within a hybrid cloud environment, comprising 1) a network virtualization manager, also called a "virtual network manager," to create secure overlay networks that transparently extend across the hybrid environment such that any workloads configured to communicate with each other over a LAN can do so regardless of where they reside in the hybrid environment; 2) a workload migrater that can migrate workloads between physical, virtual or cloud servers throughout the hybrid environment; 3) an image library that can be used to store server images such that they can be deployed at some later time; and 4) a migration manager application that provides a control interface, that maps and manages the resources of the hybrid environment and the virtual network, and that coordinates the process of migrating a complex application. Such a solution can fully automate the migration of one or more of the workloads comprising a complex application to any server throughout the hybrid environment such that all workloads retain their original network configuration and network relationships with peer workloads, ensuring that the application, its operational environment, and its user access procedures are all substantially unmodified. Using the image library to store server images, the solution can also create multiple copies of a complex application, scale portions of the application when necessary by increasing the number of workloads, recover failed workloads, and provide disaster recovery.

According to another aspect, a system and methods as disclosed herein uses overlay networks to link the server and network resources of a plurality of private data centers and a plurality of public clouds to create a hybrid cloud environment. Within this environment, one or more of the workloads comprising a complex application can be migrated from their original source servers to any other available servers while maintaining the network relationships between them. This automates the migration of complex applications throughout the hybrid environment without modifying the application, its operational environment, or its user access procedures.

In one embodiment, the network virtualization manager uses Layer 2 bridging and encrypted tunnels to securely and transparently create overlay networks that span the plurality of data centers in the hybrid cloud environment. Servers that are directly connected to a trusted network infrastructure, such as that in a private data center, can be connected to an overlay network using VLANs. Servers that are directly connected to an untrusted network infrastructure, such as that in a public cloud, are connected to an overlay network using a special tunnel driver that creates an encrypted tunnel between the server and a trusted virtual network appliance that is installed within that data center environment. Thus, when a workload is migrated from one server to another, its network communications with peer workloads are undisturbed. Neither it nor its peers can tell that it has moved even if it has changed data centers.

In one embodiment, the workload migrater manages the migration of individual workloads from their source server to any available physical, virtual or cloud server—provided that the source and target server are object code compatible. When deployed onto a new server, the workload's configuration is automatically updated to account for changes in server hardware, and to install the tunnel driver when necessary. The workload migrater can also save a copy of the workload's image in an image library so that it can be deployed at a later time.

In one embodiment, a migration manager interacts with administrative users and applications, maintains a map of the resources throughout the hybrid environment, and manages the deployment, scaling and migration of complex applications. It makes use of the network virtualization manager to create and manage the overlay networks that link the hybrid cloud environment. It makes use of the workload migrater to migrate the individual workloads that comprise the complex application.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 2 is a block diagram of a typical complex application.

FIG. 3 is a block diagram illustrating the network issues that can break the network connections between the components of a complex application during migration.

FIG. 4, consisting of FIGS. 4A and 4B, is a block diagram showing an exemplary overlay network illustrating how the use of overlay networks can be used to fix the broken connections when migrating a complex application, and details of the exemplary overlay network, respectively.

FIG. 5 is a block diagram showing the construction of an overlay network.

FIG. 6 is a block diagram showing six exemplary methods for connecting a server to an overlay network.

FIG. 7 is a block diagram showing an exemplary method for extending an overlay network between data centers.

FIG. 8A illustrates a star network overlay network topologies.

FIG. 8B illustrates a traffic-based optimization overlay network topology.

FIG. 8C is a block diagram showing the primary components of the virtual network manager.

FIG. 9 is a block diagram showing the primary components of an exemplary network map.

FIG. 10 is a flow chart showing the process of deploying virtual network appliances (VNAs) and overlay networks.

FIG. 11 is a block diagram showing the primary components of the workload migrater.

FIG. 12 is a flow chart diagramming the workload deployment process executed by a migration manager.

FIG. 13 is a block diagram showing the primary components of the migration manager.

FIG. 14 is a block diagram showing the primary components of an application map.

FIG. 15, consisting of FIGS. 15A-15C, are block diagrams of application maps as discovered by an application dependency mapping tool, modified to use a node farm, and after an application has been captured, respectively.

FIG. 16, consisting of FIGS. 16A and 16B, show the block diagrams of FIG. 15 converted to an application template and a new copy of the application as deployed from the template, respectively.

FIG. 17 is a state diagram of the possible application state transitions.

FIG. 18 is a flow chart diagramming the application migration process.

DETAILED DESCRIPTION

Figure 1:
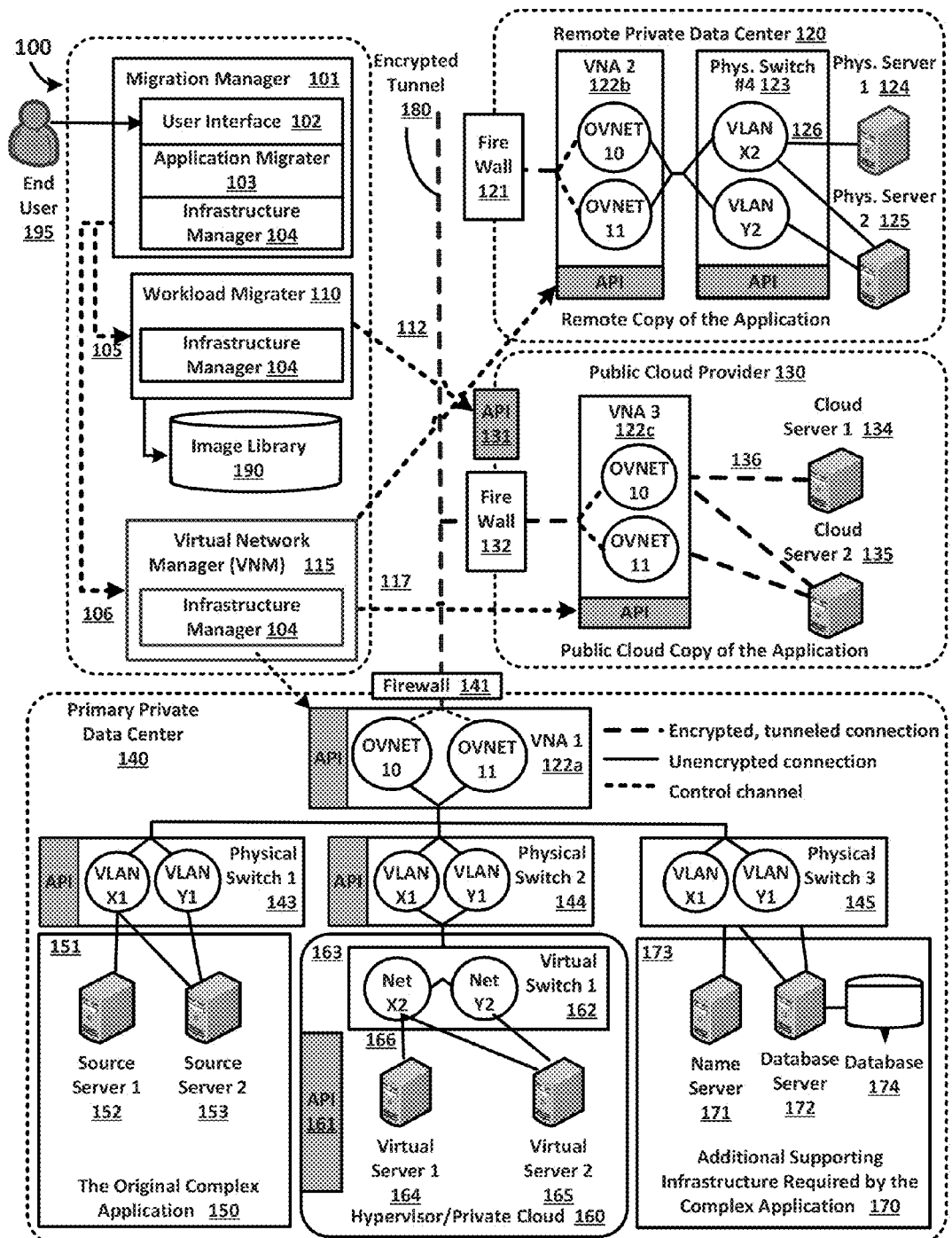
FIG. 1 is an exemplary embodiment of a system for migrating complex applications within a hybrid cloud environment.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

As shown in FIG. 1, an exemplary embodiment of a system 100 for automating the migration of complex applications within a hybrid cloud environment comprises a migration manager 101 that is responsible for interacting with the end user 195 and coordinating the migration of complex applications, a workload migrater 110 that is responsible for migrating individual server images from one physical, virtual, or cloud server to another, an image library 190 that is used to store individual server images such that they can be deployed at a later time, and a virtual network manager 115 that creates overlay networks that span a hybrid cloud environment comprising one or more data centers 120 and 140 and one or more public cloud providers 130.

Briefly summarized, a system 100 constructed as described herein carries out a process or processes for migrating a complex computer application from an initial application configuration to a new, "migrated" application configuration. As used herein, an "initial application configuration" is one where the application may have been initially installed and is operative on various initial computer servers, has various initial application-specific network connections to other servers or network devices, and has externally-appearing network connections to other computer systems and/or network devices. As used herein, a "migrated application configuration" is a transformed configuration where the application is installed and is operative on other, perhaps improved or upgraded computer servers selected from available resources, maintains certain application-specific network connections to other servers or network devices, but also transparently maintains any externally-appearing network connections to other computer systems and/or network devices.

As will be understood after the following detailed description, and in one aspect, the system 100 facilitates the identification of available computing and/or network resources from one or more "resource pools" provided within one or more data centers (public or private), establishment of certain virtual network appliances (VNAs) from available computing and/or networking resources, and automated deployment of the necessary connections of virtual network appliances (VNAs) to create overlay networks and other elements so that the complex application can run in the new, migrated application configuration. This allows convenient and efficient benefits such as application scaling, load balancing, application and network performance optimization, system failure restoration, redundancy infrastructure, system upgrades, cost control, and other similar benefits.

Details of an exemplary migration manager 101 can be found in FIG. 13 and the corresponding text. The migration manager controls the overall process of migrating a complex application to the new migrated application configuration. In one embodiment, a migration manager is a computer program or program module that executes on a computer that may be considered as a migration manager computer.

Details of an exemplary workload migrater 110 can be found in FIG. 11 and the corresponding text. The workload migrater is responsible for migrating individual workloads, as a part of an application migration operation. In one embodiment, a workload migrater is a computer program or program module that executes on a computer that may be considered as a workload migrater computer.

Details of an exemplary virtual network manager 115 can be found in FIG. 8C and the corresponding text. The virtual network manager is responsible for building and managing the overlay networks required by the complex application so as to maintain the transparency of the complex computer application as to its connections and operations by end users of the application. In one embodiment, a virtual network manager is a computer program or program module that executes on a computer that may be considered as a virtual network manager computer.

Details of an exemplary image library 190 can be found in FIG. 11 and the corresponding text. The image library stores the server images captured by the workload migrater so that they can be reused at a later date.

The Virtual Network Appliance (VNA) and Overlay Networks

In one embodiment, the virtual network manager (VNM) 115 creates one or more overlay networks that run on top of the available network infrastructures within each data center environment (e.g. 120, 130, 140) by deploying and then managing at least one virtual network appliance (VNA) 122 into each data center. As shown in FIG. 1, three VNAs 122a, 122b, 122c are shown, one provided for each of the data centers 140, 130, 120, respectively, forming one or more overlay networks (e.g. OVNET 10, OVNET 11) having elements within each of the data centers. If a data center contains more than one isolated network environment, the VNM 115 deploys at least one VNA 122 to each network environment. More than one VNA can be used within a network environment to provide redundancy and scalability (i.e., greater network throughput between environments). According to one aspect, each VNA 122 can support a plurality of overlay networks, and joins one or more network segments within its local network environment to each of the overlay networks for which it is configured. A VNA's local network environment includes all of the LANs or VLANs that it can directly access via at least one of its network interfaces.

In one exemplary embodiment, an overlay network is extended between VNAs using a tunneled connection 180. When the connection between VNAs must traverse an untrusted network infrastructure, such as the Internet, the tunneled connection 180 can be encrypted and authenticated to ensure that the overlay network remains secure and isolated. In the example embodiment in FIG. 1, overlay network OVNET 10 extends across all three data center environments 120, 130, and 140. Within the primary private data center 140, OVNET 10 traffic is carried on VLAN X1 151, 163, and 173, and on the virtual network X2 166 provided by the hypervisor/private cloud infrastructure 160. In the remote private data center 120, OVNET 10 traffic is carried on VLAN X2 126. The public cloud provider 130 does not expose VLAN support to its users, so OVNET 10 traffic is carried over encrypted tunnels 136 to each server within that environment that is authorized for access to the overlay network.

Although they are in different data centers on network infrastructure managed by different organizations, the servers 124, 134, 152, 164, and 171 are all connected to the overlay network OVNET 10, share a subnet, and communicate as if they were connected to the same local LAN.

Refer now to FIG. 4B for further details and aspects of overlay networks, in particular with the exemplary overlay network 310 shown in FIG. 4A. FIG. 4B shows additional details on the operation of the overlay network 310 in FIG. 3. In this example, the application server workload (ASW) 206 and web server workload (WSW) 204 are in different physical locations and are not connected to the same local area network (LAN). Prior to any network communications between the ASW and WSW, VNA1 401 is deployed into the physical location containing the ASW, and VNA2 402 is deployed into the physical location containing the WSW. VNA1 401 is configured such that its network interface #0 (NIC 0) is connected to the Internet 201 and its network interface #1 (NIC 1) is connected to a subnet within its physical location that corresponds to LAN 1 430. VNA2 402 is also configured such that its network interface #0 (NIC 0) is connected to the Internet 201 and its network interface #1 (NIC 1) is connected to the subnet within its physical location that corresponds to LAN 1 432. VNA2 402 is configured to run a tunnel server software process 420 that connects to a bridge software process 421 that routes traffic for LAN 1 432. VNA1 401 is configured to run a tunnel client software process 411 that connects to a bridge software process 410 that routes traffic for LAN 1 430. VNA1 is configured to create an encrypted tunnel 431 between itself and VNA2 402. The tunnel client software process 411 on VNA 1 401 is configured to create an encrypted tunnel connection to the tunnel server software process 420 on VNA2 402. In this particular embodiment, the tunnel client 411 relies upon the Internet transmission control protocol (TCP) to create a reliable network connection with the tunnel server 420 over the Internet or other intervening network technology.

Prior to the AWS 206 sending data to the WSW 204, it must first identify where to send the data. It will use the domain name service (DNS) to convert the name of the destination, WSW, to its network address, 10.1.1.10. It will then use the address resolution protocol (ARP) to ask the surrounding network where to send data for address 10.1.1.10. This "ARP request" is received by the LAN 1 bridge 410 on VNA1 401, which forwards it through the tunnel 431 to the LAN 1 bridge 421 on VNA2 402. The bridge on VNA2 forwards the ARP request onto its local LAN 1 432, where it is received by the WSW 204. The WSW returns an "ARP response" indicating that all traffic for address 10.1.1.10 should be sent to its layer 2 (typically ethernet) address. The response travels back over the same path. It is received by the LAN1 421 bridge on VNA2 402. The bridge records the layer 2 address of the WSW, and then substitutes its own layer 2 address into the ARP response before sending it on to the LAN1 bridge 410 on VNA1 401. This bridge records the layer 2 address of the previous bridge and substitutes its own address into the ARP response before returning it to the ASW.

When the ASW sends data to the WSW, it will package it into a data packet using a data transmission protocol such as TCP as shown in 440. The TCP header 450 contains the address of the destination, WSW, which is 10.1.1.10. The header is followed by the actual data 451. Remembering the results of the ARP process described above, the ASW sends all network packets addressed to 10.1.1.10 to NIC 1 of VNA1, where it is received by VNA1's LAN1 bridge 410. The bridge forwards the packet to the LAN1 bridge 421 on VNA2 402, by forwarding it through the encrypted tunnel. Before sending the packet over the Internet, the tunnel client 411 on VNA1 encrypts the entire packet 450 and 451 and stores it within a new TCP data packet 461. The tunnel client sets the address in the new TCP header 460 to the network address of VNA2 402. When this encapsulated packet 441 is received by the tunnel server 420 on VNA2 402, it pulls the original packet out of the TCP data 461 and decrypts it, recovering the original TCP packet 432. This is forwarded to the LAN1 bridge 421 on VNA2 402, which forwards it again to the WSW. The entire multi-hop forward and encapsulation process is completely transparent to ASW and WSW— i.e., the process looks the same to the ASW and WSW as if they were directly connected to one another on a local area network.

From the foregoing, those skilled in the art will understand and appreciate that an overlay network such as the example 310 provides a mechanism for maintaining the addressing relationships between workloads of a complex application in a manner transparent to the servers that execute the workloads. According to an aspect of the disclosure, as discussed in connection with FIG. 5, a VNA such as that shown at 500 in FIG. 5, is deployed at endpoints within a primary private data center 140, any remote private data centers 120, and/or any public cloud providers 130, that provide a pool or pools of server resources that can be assigned for use as target servers in a migration operation, with encrypted tunneling if desired for secure communications, thereby providing for transparent continued operation of the complex computer application upon migration of the application into new server resources.

FIG. 5 shows one embodiment of a Virtual Network Appliance (VNA) 500. At its center, the example VNA 500 contains a software switch 501 that connects the network traffic from a plurality of network segments 502-507 into a single overlay network, for example and as shown in the figure, OVNET 10. If the VNA were supporting additional overlay networks, each would have its own dedicated software switch similar to 501 that joined the network segments specific to that overlay network. As the switch operates at layer 2, it forwards all network traffic including broadcast and multicast traffic. This makes it transparent, appearing to all network users as if the plurality of network segments were directly connected as a single LAN.

In the example of FIG. 5, the VNA 500 is implemented as a workload that runs on a physical, virtual or cloud server such that the VNM can deploy it automatically using the workload migrater 110. This allows a system constructed as described herein to automatically deploy the virtual network infrastructure into new regions of the hybrid cloud. Those skilled in the art will recognize that other implementations of a VNA can also be used provided that they are able to join local LANs and VLANs to those of a remote peer using an encrypted network tunnel. Examples of other implementations of a VNA that would work with the disclosed exemplary system include open source software such as OpenVPN or Vyatta and most commercial virtual private network (VPN) implementations. It will also be appreciated that the VNA can be implemented in other forms, such as software that runs on a physical network switch or as a virtual switch that runs within a hypervisor host.

Once a VNA, e.g. as shown at 500 in FIG. 5, has been deployed and is operational within its environment, a local network mapper 535 associated with the VNA discovers the LANs, subnets, and servers within its environment using common discovery techniques such as ICMP and SNMP, although those skilled in the art will recognize that other discovery techniques can be used. The VNM 115 queries the VNA's application programming interface (API) 537 to read the results of the discovery process and adds them to its network map. The VNM will also use the API to extend an overlay network into the new environment. Using the API, the VNM can create a software switch on the VNA for the overlay network, connect it to one or more local network segments, configure a tunnel server for receiving tunnel connections from workloads or other VNAs, and configure a tunnel client to connect to another VNA. As part of this configuration process the VNM supplies the VNA with the cryptographic key information 522, 523, and 524 needed to authenticate and encrypt tunnel connections for the overlay network.

After an overlay network has been configured on a VNA, it collects packet flow statistics from the network and all of its joined segments 536. The VNM 115 can retrieve these statistics using the API and analyze them to determine the health of the VNA and its overlay networks. The statistics can also be used as data for the routing algorithms used by the VNM to optimize the connections between VNAs that comprise the overlay network topology.

FIG. 5 illustrates five exemplary types of network segments 502, 504, 505. 506, 507 that the exemplary embodiment can join into an overlay network. Those skilled in the art will understand that other types of networks can also be joined into an overlay network, and that the VNA can join any number of network segments into an overlay network. While only a single overlay network is shown in the figure, those skilled in the art will understand that the VNA can simultaneously manage any number of overlay networks. In the figure, network segment 502 joins VLAN 1 550 to overlay network OVNET 10. As the VNA is a trusted component of the network infrastructure, it is trusted to use a tagged VLAN interface 510 for this segment and to multiplex it with any other tagged VLAN segments over a single network interface (NIC) 530. A component of the network infrastructure such as the VNA is considered "trusted" if the users of the network believe in the integrity of the hardware, software, and administrators of that component and trust that the component will correctly switch network packets between the joined network segments while ensuring their isolation, integrity, and secrecy. Note that when joining a VLAN network segment to an overlay network, the network switching infrastructure 540 must also be trusted to properly enforce VLAN isolation throughout the local network environment.

Network segment 504 joins a network segment for which the VNA is not able to use tagged VLANS 560 to the overly network. This might be the case if a network interface (NIC) is running a protocol that does not support VLAN tagging, or if the network switch is configured for untagged VLAN support. For example, the endpoint for the network interface (NIC) 531 is connected directly to the overlay switch 501 and cannot be used for any other overlay network. Ensuring that traffic on the overlay network is properly isolated and secure requires the assistance of a network switching infrastructure 541 that is trusted to isolate LAN traffic throughout the local network environment. It can do this using logical separation throughout the local network or by providing a physically isolated environment.

Network segments 505, 506, and 507 show three types of tunneled network segments. Tunneled segments are used for two purposes: 1) to join an individual workload rather than a network segment to an overlay network; and 2) to extend an overlay network between VNAs.

A tunneled network segment wraps a layer 2 packet (e.g., a packet constructed using the Ethernet protocol) within a higher layer (typically layer 3 (IP) or layer 4 (UDP or TCP)) datagram or connection and sends it to a peer. The peer unwraps the layer 2 packet, examines the address headers, and forwards it on a local network segment to the intended recipient. Wrapping the layer 2 packet with an upper layer protocol allows the VNA to do two things: 1) use the capabilities available at the upper layers to reliably route and transfer the packet across networks that could not be traversed at layer 2; and 2) optionally wrap the layer 2 packet using encryption and authentication to provide data integrity and secrecy over untrusted network infrastructures. The example shown in FIG. 5 uses the OpenVPN protocol for tunneling. Those skilled in the art will understand that other tunneling protocols such as the Point-to-Point Tunnel Protocol (PPTP), Layer 2 Tunneling Protocol (L2TP), Virtual eXtensible LAN (VXLAN), Network Virtualization with GRE (NVGRE), Stateless Transport Tunneling (STT), or Network Virtualization Overlays (NVO3) could also be used.

Still referring to FIG. 5, exemplary network segment 505 illustrates a connection-oriented tunnel that runs over TCP with the VNA 500 receiving incoming connections. Those skilled in the art will understand that connection-oriented protocols other than TCP could be used for a tunnel connection. A tunnel server 512 listens for incoming connection requests. Upon receiving a connection from a remote peer 570, it joins the connection to the overlay switch 501. Remote peers might include individual workloads or remote appliances. The tunnel server and switch can support any number of concurrent connections. If the network infrastructure 542 between the VNA and the peer is trusted, then it is not necessary to use encryption to protect the tunnel connection. If the intervening network is not trusted, then the tunnel connection needs to be authenticated and the tunnel protocol needs to cryptographically ensure the integrity and secrecy of any data transferred. Cryptographic keys 522 and 571 are used to provide security services, if required. These can be shared secret keys or public/private key pairs. Keys are distributed to the VNA by the VNM 115 when it adds the overlay network configuration to the VNA. Keys are distributed to an individual workload by the workload migrater 110 as part of the migration process. Those skilled in the art will understand that any security protocol and cryptographic algorithm that provide the necessary authentication, integrity and secrecy can be used to protect tunnel traffic.

Exemplary network segment 506 illustrates a connection-oriented tunnel that runs over TCP with the VNA 500 initiating the connection from its tunnel client 513 to the tunnel server 580 of a peer VNA in order to extend an overlay network between them. Those skilled in the art will understand that connection-oriented protocols other than TCP could be used for a tunnel connection. Cryptographic keys 523 and 581 are used to provide security services, if required. They are distributed to the VNAs by the virtual network manager 115 when it adds the overlay network configuration to the VNA.

Exemplary network segment 507 illustrates a connectionless datagram tunnel. The datagram tunnel process 514 exchanges layer 2 packets wrapped within UDP datagrams with one or more peer processes 590 on individual workloads or peer VNAs. Those skilled in the art will understand that connectionless protocols other than UDP can be used for a datagram tunnel. Cryptographic keys 524 and 591 are used to provide security services, if required. They are distributed in the same manner as the keys for the connection-oriented tunnels. Connectionless datagram tunnels are more efficient than connection-oriented tunnels in network environments with low latency and low packet loss. Thus connectionless tunnels are typically used when peers are within the same data center environment. Connection-oriented tunnels are more efficient with higher latencies and packet loss, and recover better from network disruptions. Thus, connection-oriented tunnels are typically used to link VNAs over the Internet or other wide area networks (WANs).

FIG. 6 shows some exemplary different methods by which the exemplary embodiment can connect an individual workload to a specific overlay network, e.g. OVNET 10 654, assuming that a VNA 650 has been configured to implement that overlay network within the workload's local network environment. At a high level there are two approaches: 1) connect the workload to a VLAN 651 that the VNA maps onto the overlay network; 2) configure the workload with an encrypted tunnel that connects to the tunnel server 653 that the VNA maps to the overlay network. When migrating a server from one network environment to another (i.e., from one hardware infrastructure to another, or from the local environment of one VNA to another), it might be necessary to reconfigure the server's connection to the overlay network so that it matches its new environment.

Server 1 601 is a trusted server and is connected to OVNET 10 by configuring it with a network interface for tagged VLAN 32 604, which the VNA maps to OVNET 10. A server can be "trusted" when the operating system (OS) and administrators of that server are trusted not to change the tagged VLAN configuration, and if the server is properly secured such that an attacker cannot change the configuration, for if it were changed, the server might then be connected to an unapproved overlay network. When using a tagged VLAN connection to an overlay network, the workload migrater 110 will configure the server's network setup to include the tagged VLAN interface. This approach works with network infrastructure 605 that cannot be directly managed by the VNM 115 (i.e., the VNM cannot change its configuration when deploying a server) but is trusted to properly isolate VLAN traffic. Due to the risk associated with trusting the server, its OS, and administrators, this approach is not often used and is usually supplanted with a tunneled connection as described below for Server 4 631.

Server 2 611 is an untrusted server that is connected to OVNET 10 by connecting its network interface to VLAN 32. As the server is not trusted, it is placed onto the necessary VLAN ID 32 614 by using an untagged switch port on the managed switch 615. As part of the server deploy process, the VNM configures the switch using one of the switch's APIs 619. This approach can only be used when an infrastructure manager 104 (see FIG. 8C) on the VNM 115 has a driver or plug-in 814 that can be used to configure the specific model of switch connected to the server. As there are many models of network switches, this is not always the case. If an appropriate switch driver is not available, a tunneled connection can be used instead.

Still referring to FIG. 6, virtual server 3 621 is an untrusted server running on the trusted virtualization host 620. When the workload migrater 110 creates the virtual machine as part of the deploy process, it will use the virtualization host's API 629 to create the virtual machine such that it has a virtual network interface connected to a virtual switch 625 that is connected to VLAN 32 624. This approach requires a virtualization host 620 and an unmanaged network infrastructure 626 that are trusted to enforce VLAN isolation. It also requires that the infrastructure manager 104 (see FIG. 8C) on the VNM have a driver or plug-in 812 that can be used to configure the specific model of virtualization host. As just a few hypervisors (VMware, Xen, KVM, HyperV) provide the vast majority of virtual machines, only a few plug-ins are required.

Server 4 631 is an untrusted host that is connected to an untrusted network infrastructure 636. When the workload migrater 110 deploys the server, it connects it to OVNET 10 by installing and configuring a tunnel client driver 634 and then installing the key material 635 and configuration data necessary to connect to the VNA's tunnel server 653. Because the tunnel traffic is encrypted and authenticated, its integrity and secrecy is maintained even when traveling over untrusted networks. The most likely attack that could be mounted by a subverted server or network would be a denial-of-service by refusing to deliver the encrypted packets. This approach works for all workloads whether they run on trusted or untrusted servers and networks. But due to the overhead associated with encrypting/decrypting the network traffic, a VLAN approach is preferred where available when the server or network infrastructure is trusted.

Virtual Server 5 641 is an untrusted server that runs on an untrusted virtualization host 640 and communicates over an untrusted network infrastructure 646 and 647. This is a typical example for public cloud servers, where the cloud vendor and its employees cannot be trusted by the private data center. The approach uses encrypted tunnels just as was described for Server 4 above. Because the tunnel traffic is encrypted and authenticated, its integrity and secrecy is maintained even when traveling over untrusted networks, hypervisors, and cloud infrastructures. This approach is listed as a separate case only to emphasize the fact that encrypted tunnels also protect the overlay network from compromised cloud infrastructure. Virtual Server 6 671 runs as an untrusted VM on the trusted Virtualization Host 3 670 on which the standard virtual network switch that comes by default with the virtualization host (such as 625 and 646) has been replaced with a VNA plug-in 675. Operation of the plug-in is nearly identical to that of the standard virtual switch. Like the standard virtual switch, the plug-in is configured with a separate virtual switch 676 for each VLAN (overlay network) to be enforced. Each network interface 673 on a VM is connected to one of the configured switches within the plug-in. But rather than forward external traffic (i.e., communications that travel outside of the virtualization host) over a tagged VLAN and enforcing VLAN access controls as does the standard virtual switch, the plug-in forwards external traffic to peer VNAs using encrypted tunnels 677 and enforces overlay network access controls. This approach supports untrusted VMs and untrusted network infrastructure without the use of client tunnel drivers within the workload. But as the tunnel client has been moved from the workload into the plug-in, this approach requires that the virtualization host and plug-in be trusted.

FIG. 7 shows an approach used by the example embodiment to extend overlay networks between data centers 120, 130, and 140, and between isolated network environments within a data center. When the end user 195 initially configures the system via the user interface 102, he designates one network environment as the primary data center 140. When the VNM 115 then deploys the virtual network, it first deploys a VNA into this primary data center environment and configures it to be the primary appliance 122a. All other VNAs 122b and 122c deployed by the VNM are secondary appliances and are configured to connect their overlay networks to a matching tunnel server 719 on the primary VNA 122a using a tunneled connection 725 and 745. The cryptographic key material 720, 740, and 761 used to authenticate and encrypt these connections is distributed to the VNAs by the VNM as part of configuring each overlay network. Within the private data center environments 120 and 140 where the network infrastructure is trusted, individual VLANs 716 and 736 are joined to the overlay network. If the servers are trusted, they can be connected to the overlay network using a tagged VLAN interface as in FIG. 6 601. If the servers are not trusted, then they can be connected to the overlay network using an untagged VLAN interface as in FIG. 6 611 or using a tunnel as in FIG. 6 631. Within an untrusted environment such as a public cloud provider 130, server 751 is connected to the overlay network using a tunnel client 754. To support workloads with tunnel clients, the VNA 122c within such an environment runs both a tunnel server 758 to receive connections from the clients as well as its own tunnel client 760 to connect 745 back to the tunnel server on the primary VNA 719.

The example embodiment extends all configured overlay networks by connecting all secondary VNAs to the primary VNA to create a star network topology as shown at 850 in FIG. 8A. When two servers are in the same data center environment, such as servers 2 and 3 in FIG. 8A, there is at most a single VNA hop between them (VNA 2 in this example). If this VNA is using VLANs to implement the overlay network within its network environment and the two servers are connected to this VLAN, there wouldn't be any hop through the VNA as the two servers can communicate directly over the trusted network infrastructure using tagged VLANs. When one server is in the primary data center (e.g. 140) and another is in a secondary data center (e.g. 120), such as servers 1 and 2 in FIG. 8A, there are two VNA hops (VNA 1 and VNA 2) and one tunnel between them. When two servers are in different secondary data centers such as servers 3 and 4, there are three VNA hops (VNA2, VNA1, VNA3) and two tunnels between them. The star topology guarantees that the worst delay between any two communicating servers is three hops and two tunnels.

Packet loops—i.e., network topologies that contain a loop such that packets can be forwarded continuously around the loop—are dangerous as they can consume all network bandwidth within the network infrastructure, preventing useful communication. The use of layer 2 protocols such as the Spanning Tree Protocol (STP) and Shortest Path Bridging (SPB) eliminate loops by disabling redundant connections. However, the packets used by these protocols to communicate between switches are sometimes suppressed within public cloud environments for security reasons. This makes it dangerous to rely upon these protocols for protection against loops when creating an overlay network that includes a public cloud network. Thus, the example embodiment uses the star topology to eliminate any possibility of a loop while guaranteeing a maximum of three hops for all network communications.

Each hop through a VNA and each data transfer over a tunnel between VNAs adds delay to network communications. In a star topology such as 850 in FIG. 8A, if the servers and communications between them are randomly distributed, the majority of communications will incur the maximum three hop delay. Thus, an important performance consideration when migrating one or more workloads of an application is to keep portions of an application that communicate together within the same VNA environment.

As will be discussed in later paragraphs, the VNM 115 maintains a network map, such as shown in FIG. 9, of all network environments and the overlay networks within. The migration manager 101 maintains an application map that lists the servers in each application, which environment they are in, and the overlay networks that they use.

Turning now to FIG. 8C, a VNM 115 can use this combined information to perform topology optimization for each overlay network as shown at 851 in FIGS. 8A and 8B. The legend in FIG. 8B shows connections between a number of components (servers and VNAs) forming overlay networks OVNET1 860-OVNET4 863.

For OVNET 1 860, servers 1 and 8 communicate with server 2 but not with each other. Therefore making VNA 2 the hub for OVNET 2 eliminates all three hop connections. As there is no reason why all networks need to use the same hub, the choice of hub for each overlay network can be made to optimize its traffic.

OVNET 2 861 is only used by the servers in network environments 2 and 3, so there is no need for a hub and the network consists of a single connection between VNA 2 and VNA 3.

For OVNET 3 862, servers 3 and 5 communicate with server 1 but not with each other, so making VNA 1 the hub optimizes the traffic between them. Server 6 is also on OVNET 3 but only communicates with server 5, so VNA 4 can be connected directly to VNA 3 to optimize the traffic between them.

When a server connects to an overlay network using a tunnel client but does not access any servers within its own environment on that network, such as server 7 on OVNET 4 863, it can be configured to connect directly to a remote VNA (e.g. VNA 1 in FIG. 8B) rather than its local VNA, eliminating one or two hops and tunnels.

Together this set of changes eliminates all three-hop connections from the example network of 851, converting some three-hop connections to a single hop. Note that when making these optimizations, the VNM must ensure that it does not create any loops among the connections for an overlay network.

In a further optimization, the VNM can collect packet flow statistics FIG. 6 660 for all overlay networks throughout the hybrid cloud environment and dynamically reconfigure their connection topology to optimize the number of hops taken by network traffic. Various optimization algorithms could be used to enforce different policies such as: minimizing the aggregate number of hops for all traffic, or, optimizing the number of hops for specific high priority traffic flows or servers.

The Virtual Network Manager (VNM)

FIG. 8C shows the components of an exemplary VNM 115 that is used to build out and manage the virtual network environment. A network mapper 801 creates and manages a map 810 of the virtual network linking the hybrid cloud environment. Each VNA deployed by the VNM contains a local network mapper FIG. 6 661, which discovers the LANs, subnets, and servers within the VNA's local network environment using typical techniques such as ICMP and SNMP. The primary network mapper 801 on the VNM pulls the local network data from each VNA using the VNA API 537 (FIG. 5). It combines the information into a single map of the hybrid cloud network environment and includes the LANs and subnets of each environment and the overlay networks that span them.

An appliance manager 802 is used to extend the hybrid cloud environment by deploying, monitoring, and managing VNAs. The appliance manager makes use of the workload migrater 110 to perform the actual deployment of the VNA into a network environment within a data center. Once a VNA has been deployed into a network environment, the appliance manager 802 can extend an overlay network into that environment by using the VNA API 537 (FIG. 5) to configure the VNA with a software switch specific to the overlay network, connecting local network segments to the switch, and installing overlay network key material.

A tunnel manager 803 configures, monitors, and manages the tunnel connections throughout the hybrid cloud environment. It establishes the topology of an overlay network by configuring the tunnels between VNAs using the VNA API 537 (FIG. 5), and can dynamically reconfigure these tunnels to optimize traffic flow. The tunnel manager also creates the software installation packages that are installed by the workload migrater on top of a migrated server image in order to link a migrated workload into an overlay network.

A VLAN manager 804 configures, monitors, and manages the VLAN segments that are linked into an overlay network. Using the VNA API 537 (FIG. 5), it configures a VNA to add a VLAN to an overlay network by adding a tagged VLAN interface to the VNA or linking a specific network interface to the software switch. It connects individual servers to an overlay network by configuring their network switch port or hypervisor interface for the proper VLAN ID, using the API of the corresponding network switch or hypervisor host.

An infrastructure manager 104 provides an abstraction API that is used by the other VNM components for managing VNAs, public clouds, hypervisor hosts, and network switches. This allows invention system constructed as described herein to support multiple technologies for each type of device. When the infrastructure manager 104 needs to manage an infrastructure component, such as a network switch, that it cannot access directly because it is on a remote network segment, it can proxy its commands to the device through the VNA that is local to the device.

Most of the operations performed by the VNM 115 involve many steps and many components. A task sequencer 805 is provided in the VNM 115 and responsible for performing the sequence of steps in a robust manner, waiting for steps to finish, retrying them to recover from transient errors, and backing out changes when encountering an unrecoverable error.

The Network Map

FIG. 9 shows the high level data structure or schema of an exemplary network map 900, which in the example embodiment is implemented as an XML file. One skilled in the art will recognize that the network map can be stored in many other formats such as a relational database, JSON, or other data structure. The network map 900 comprises a list of one or more NetworkDomains 910 that comprise the virtual network environment and a list of one or more OverlayNetworks 940 that are defined within that environment. Each network domain is a region of network infrastructure controlled by a single organization over which VLANs are consistently enforced and trusted throughout. In FIG. 1 the primary private data center 140, the remote private data center 120, and the public cloud provider 130 are separate network domains. Even if the primary and remote private data centers are controlled by the same organization and enforce the same VLANs, they are separate network domains as they do not have a secure communications link between them. By defining each as a separate network domain, each will be provided its own VNA to securely link the environments.

If an organization has already linked its data centers with a virtual private network (VPN) or other secure link, it can be treated in either of two ways: 1) the linked data centers can be considered a single network domain; or 2) each data center can be considered a separate network domain. Note that in the first approach network traffic might travel over the VPN in order to reach the VNA so that it can be tunneled to another network domain. Thus, the decision between the two approaches will typically be made based upon the expected network traffic and the bandwidth provided by the existing secure link implementation. Public cloud providers that have more than one regional data center are typically modeled using a separate network domain for each region. Even if the cloud vendor provides secure internal networking between its geographically dispersed regions, the efficiency of the overlay networks is typically improved by using a separate VNA in each region.

Each overlay network in the list 940 in FIG. 9 is a virtual network that operates across the physical network infrastructures provided by the various network domains. The OverlayNetwork record 940 within the network map is used to provide a global identifier for an overlay network that traverses more than one network domain. The LocalOverlayNetwork records 934 within each NetworkDomain define how the overlay network is implemented within the infrastructure of that network domain.

Each OverlayNetwork record 940 contains an ID (OVNET_ID) 941 and name (OVNETName) 942 that are unique throughout the hybrid cloud environment. Other attributes stored for an overlay network can include a description 943, an optimization policy 945 to specify the topology used to link VNAs, and access control attributes 944 controlling which end users can manage the network, access the network, or deploy a server onto the network.

Each NetworkDomain record 910 contains an ID (NetworkDomainID) 911 and name (Network DomainName) 912 that are unique throughout the hybrid cloud environment, a description 913a, and access control attributes via a data item (AccessControls) 913b controlling which end users can manage the domain, access the domain, or deploy a server into the domain. It also contains a plurality of VNA records 914 that record information about the VNAs that are deployed within the domain. Each VNA record specifies the type of VNA appliance 919, the current state of the appliance 920, the external network address of the appliance that is used by tunnel clients when connecting to the appliance's tunnel server 921, the URI for accessing the appliance's management API 922, and the credentials for administering the appliance 923. Access control information is not needed for the VNA as its access is controlled using the access control data item (AccessControls) 913b of the network domain record 910.

Each NetworkDomain record 910 also includes a plurality of ResourceDomain records 924, specifying server resources that can be dynamically provisioned by the migration manager within that network domain. Each ResourceDomain record 924 represents a pool of server resources (in other words, a "resource pool") that are managed through a common management API, such as: a) physical servers that are configured for deployment using PXE (Preboot eXecution Environment) boot or ISO boot (i.e., boot from an ISO 9660 file system such as a CD-ROM); b) one or more hypervisor hosts such as a group of VMware ESX hosts managed by vCenter Server, or Citrix XenServer hosts; c) a private cloud infrastructures such as a VMware vCloud or OpenStack infrastructure; or d) a public cloud provider account, such as Amazon EC2 or Rackspace. Those skilled in the art will recognize that additional types of physical servers, hypervisor hosts, private cloud infrastructures, and public cloud accounts can also be supported. Those skilled in the art will also understand and appreciate that each ResourceDomain record contains information that allows access to a resource pool, as discussed elsewhere herein, for the purpose of identifying, selecting, and configuring server resources within a data center corresponding to that ResourceDomain. These server resources can be assigned for use as a target servers, virtual network appliances, or other computing and/or networking functions as may be desired in connection with a migration operation.

According to one aspect, a server resource in a resource pool (ResourceDomain) associated with a network domain (NetworkDomain) may be selected and dedicated for use in a migration operation to serve as a computing or networking resource or workload, such as a VNA, a web server, an application server, a database server, or other similar device. The resource pool can be accessed using its API to determine the characteristics of any available resources, to select one or more resource, and to make those resources available for migration.

Typically, a resource pool is a collection of server resources that are available within a particular physical data center environment, although it will be appreciated that a resource pool could include server resources that are available in different and physically separated data center environments but connected for data communications via high speed connections (e.g. via VPN), thereby forming a logical or "virtual" data center comprising facilities that are physically separated.

A ResourceDomain record 924 includes an ID (ResourceDomainID) 925 that is unique throughout the hybrid cloud, a name (ResourceDomainName) 926 that is unique within the network domain, a vendor name 930 identifying the vendor and type 929 of infrastructure, a URI 931 for accessing the infrastructure's administrative API, the credentials 932 to be used for administering the infrastructure, a set of vendor-specific attributes 933 to be used when creating a virtual server within the infrastructure, and a set of access control attributes 928 for controlling which end users can manage the resources, access the resources, and deploy a server to the resources.

Each NetworkDomain record 910 also includes a plurality of LocalOverlayNetwork records 934, each of which identifies an OverlayNetwork that is defined within the network domain and specifies the isolation method used for that overlay network within the network domain. Each LocalOverlayNetwork record contains an ID (OVNET_ID) 935 that matches one of the globally configured OverlayNetworks 940 in the network map. It also contains a list of zero or more local VLAN IDs (LVID) 936 that are linked into the overlay network, and a configuration flag 937 to specify whether or not to provide a tunnel server for linking tunnel clients into the overlay network. The LocalOverlayNetwork record also includes a URI 938 pointing to the peer (MasterServer) VNA, if any, to which the domain's VNA should connect in order to link the network domain into the overlay network.

According to an aspect, a system constructed in accordance with this disclosure further includes UserAccount data 950 for storing information associated with authorized users of the system. The UserAccount 950 record shown in FIG. 9 is not part of the network map 900 per se, and is stored instead in the User Account database 1310 (FIG. 13). It is shown here as it is essential in evaluating the access controls used to protect the resources represented by the network map. The Migration Manager 101 maintains a database of its authorized users, with a UserAccount record for each user. This contains an ID 951 and name 952, as well as the login credentials 954 used to authenticate the user. The record also contains a set of group memberships 955 to which the user belongs and a set of authorizations 956 granting the user permission to access specific features of the system. The UserAccount record also contains user default settings such as the user's default image library 957.

Deploying Virtual Network Appliances (VNAs) and Overlay Networks

A computer-implemented process 1000 by which a VNM 115 deploys and manages a virtual network, via overlay networks implemented with virtual network appliances (VNAs), is shown in FIG. 10. The VNM begins by reading the network map from the network mapper and the available application maps from the migration manager at step 1001. For each globally defined overlay network, it then computes the optimal topology connections between the defined VNAs at step 1002. As previously discussed, there are many potential topologies and optimizations. The VNM might optionally read network traffic statistics from the VNAs in order to compute the optimal topology. The optimal topology is added to the network map by specifying the inter-VNA connections as peer URIs that are added to the domains overlay network configuration data 938 (FIG. 9).

With the topology determined, the VNM 115 then checks each network domain (as identified by NetworkDomain records 910 in FIG. 9) in turn at step 1003 to see whether the VNAs specified for that domain have been deployed and are operational, at inquiry step 1004. If a VNA is not operational, the VNM calls the appliance manager 802 (FIG. 8) to deploy a new VNA workload to an available server (physical, virtual, or cloud) within the domain, at step 1005. As the VNA is considered nothing more than another workload, it is deployed by the workload migrater using the standard workload deploy process shown in FIG. 12. The target server to be used for the VNA does not require any special network configuration. It must have access to the other VNAs via a suitable network, such as the Internet, and it must have access to any local VLANs or subnets within its environment that need to be connected to overlay networks. The process loops at step 1006 to check for additional network domains that may require a VNA deployment. During the network domain checks at step 1006, the VNM also decommissions and removes any network domains and deployed VNAs that are no longer defined in the network map, at step 1007.

After all of the defined VNAs are determined to be operational at step 1008, the VNM 115 iterates the list of network domains a second time, as shown at 1009. For each network domain, the VNM 115 then checks the list of overlay networks at step 1010. The overlay networks within a NetworkDomain 910 are identified by one or more LocalOverlayNetwork records 934. If the overlay network is not currently configured for the network domain by a check at step 1011 but is found on the VNA, the VNM removes the overlay switch from the VNA at step 1017. If the overlay network is configured for the domain at step 1011, the VNM checks the network status by calling the VNA's API 665 (FIG. 6). If the network is not yet configured on the VNA, the VNM adds a software switch to the VNA at step 1012. Using its VLAN manager 804 (FIG. 8C), the VNM links into the overlay switch any local (i.e., local to the remote VNA's network environment) VLANs that are listed in the network map as part of the overlay network, via steps 1013-1015. The VNM removes from the switch any local VLANs that are currently linked to the switch but are no longer defined in the network map at step 1016.

If the network domain's local overlay network record 934 specifies that the VNA is to provide a tunnel server 937 for the overlay network at step 1018, the VNM checks the server status using the VNA API. If a tunnel server is not running for the overlay network, the VNM uses its tunnel manager 803 (FIG. 8C) to configure and start a tunnel server on the remote VNA 1019, and then links it to the software switch at step 1020. If there are currently any tunnel servers running on the VNA that are no longer defined in the network map, the VNM removes them from the VNA at step 1021.

Still referring to FIG. 10, if the network domain's local overlay network record 934 specifies one or more peer URIs 938 as the result of the previous computation of network topology from step 1002, the VNM 115 uses its tunnel manager 803 to configure a tunnel client on the VNA at step 1023, connect it to the software switch at step 1024, and then connect it to the specified peer tunnel server at step 1025. Note that if, due to the order in which the network domains are processed, the tunnel client attempts to connect to a peer tunnel server before that tunnel server has been created, the tunnel client will retry its connection until the tunnel server is available and it has a successful connection. The VNM then removes any tunnel clients that it finds configured on the VNA that are no longer defined in the network map at step 1026.

After the overlay networks have been configured for all network domains, the VNM 115 checks the network status at step 1029 by reading full status information from each VNA. It also reads the VNA traffic statistics for each overlay network at step 1030 and recomputes the topology connections based upon actual packet flow statistics at step 1031. It makes any necessary changes to the topology connections at step 1032, and then updates the network map with the current state of the network at step 1033. The virtual overlay network is now fully deployed. If the VNM is configured to continuously monitor the virtual network, it pauses for a configured interval and then loops over the networks status check and topology update, as shown in steps 1029-1033.

The Workload Migrater

Referring now to FIG. 11, a workload migrater 110 is responsible for deploying a VNA into a network domain. It is also responsible for migrating an individual workload that is part of a complex application from a source server to any other physical, virtual, or cloud server within the hybrid cloud environment. The example embodiment uses the workload migrater described in United States Patent Application Publication No. US 2013/0290542, "Server Image Migrations into Public and Private Cloud Infrastructures" (Charles T. Watt, et al.). The internal details of this workload migrater and other aspects of server image migration are described in more detail therein, and incorporated by reference herein. Those skilled in the art will recognize that other approaches to workload migration can also be used as long as they can reliably migrate a server image from any physical, virtual, or cloud server to any other physical, virtual, or cloud server.

As shown in FIG. 11, the workload migrater 110 used by the example embodiment works in conjunction with a capture agent 1131 that is installed on the source server 1130 and a deploy agent 1141 that is installed on the target server 1140. As described in the referenced Watt, et al. patent application, and as will be appreciated by those skilled in the art, server image migration can also be performed without the use of a capture and/or deploy agent if the workload migrator has access to the server's image, such as when the image is stored on a network storage device like SAN (storage area network), LUN (logical unit), or NAS (network attached storage), or when it is stored on a hypervisor host.

The capture agent 1131 associated with the workload migrator 110 gathers source image information 1101 about the source server 1130 and its image, reporting the information back to the workload migrater 110. The capture agent can also capture the server image 1191 to an image library 190 or stream the image directly to a target server 1140. After streaming or capturing its image, the capture agent can synchronize all changes that have been made to the source server's image since the last capture or synchronization directly to the target server or to the image library where they are stored as an incremental capture 1194.

The deploy agent 1141 associated with the workload migrater 110 gathers target server information 1102 about the target server 1140 and reports it back to the workload migrater 110. Upon receiving instructions from the workload migrator, the deploy agent streams the captured image from the source server or image library and deploys it to the target server along with any additional software packages and configuration changes specified by the workload manager.

The source image information 1101 contains system and application configuration data collected from the source image being migrated. This data includes the operating system vendor and version, the size and layout of the file systems, and the number of network interfaces and their configuration. During an image capture, the source image configuration data 1192 is also stored in the image library 190 along with the captured image.

A capture process 1103 of the workload migrater 110 manages the capture agent 1131 through the steps of migrating or capturing the source server's image. The image will either be streamed directly to the deploy agent on the target server or stored in the image library 190.

A deploy process 1104 of the workload migrater 110 manages the deploy agent 1141 through the steps of deploying a captured image to the target server. It gathers source image information 1102 about the server from the agent, compares it with the configuration of the original server and its workload 1101, considers any requirements specified by the end user or migration manager as specified by a deployment profile 1110, and determines how to map the image onto the resources available on the target server. For example, the deploy process 1104 might consolidate multiple file systems that had originally been on separate disk drives onto the single virtual drive available on the target.

A software installer 1105 of the workload migrater 110 installs any additional software packages on top of the original image as part of the deployment process. This is used to install drivers into the image to handle the changes in hardware between the source and target server platforms. It is also used to install the tunnel client drivers that are necessary for connecting a server that is running on untrusted infrastructure to an overlay network, for example as shown at 632 in FIG. 6. Software packages can also be used to add any special software that is required by the resource domain (e.g., cloud infrastructure, hypervisor host, etc.) for the workload to function properly within the domain.

An image configurer 1106 of the workload migrater 110 is responsible for modifying the operating system and application configuration settings on the target server 1140 after the original source image has been deployed. This is used to configure tagged VLAN interfaces on the target workload in order to connect a trusted server to an overlay network, for example as shown at 601 in FIG. 6. The image configurer makes the configuration changes that are specified in the deployment profile 1110, which is passed to the workload migrater by the migration manager. In the example embodiment, the deployment profile 1110 is an XML document describing the required configuration of the workload's network interfaces, storage volumes, file systems, etc. Those skilled in the art will recognize that the deployment profile can take many other forms, such as command line parameters to the workload migrater, a database record, or a data file.

Still referring to FIG. 11, a driver library 1107 of the workload migrater 110 provides the drivers necessary for installing an image on the target server 1140 hardware. This may include drivers for storage devices, network interface devices, graphical display drivers, etc. In the example embodiment, the driver library is stored on the workload migrater as an hierarchical directory of files. The driver files are collected from hypervisor hosts, cloud infrastructures, CD-ROM and ISO images of driver distributions, software installation packages, and directly from running servers. Those skilled in the art will recognize that driver files can be collected from many other sources and can be stored in many other formats, such as a database.

An infrastructure manager 104 of the workload migrater 110 is used to create virtual machines in cloud and hypervisor infrastructures. It is also used to configure the network interfaces on a target server 1140 so that they will access the correct overlay network. On clouds and hypervisors this is done by attaching the virtual network interface to the local VLAN within the target network domain that is mapped to the overlay network, using the cloud 811 or hypervisor 812 plug-in (FIG. 8C) to manage the cloud or hypervisor infrastructure. When using untagged VLANs to attach a server to an overlay network, the infrastructure manager must manage the network switch to which to the server is attached using the appropriate switch plug-in 814. Those skilled in the art will recognize that some workload migration technologies do not support the ability to manage infrastructure devices such as network switches and cloud or hypervisor infrastructures, and that the same results can be achieved by implementing the infrastructure management within the migration manager 101 rather than the workload manager 110. As with the previously described virtual network manager, the migration manager will proxy commands to infrastructure devices that it cannot directly access through the VNA local to the device.

Still referring to FIG. 11, a synchronization manager 1108 of the workload migrater 110 synchronizes source and target images after a migration if discrepancies between such images occur due to the time it takes to complete a migration. It will be appreciated that the time taken to migrate a workload from one server to another will vary substantially depending upon whether the source server is online or offline at the time of migration, the size of the server image, the network bandwidth between the source and target environments, and many other factors. Migration times can vary from minutes to days depending upon these factors. To ensure that a consistent image is captured from a running source server, it is necessary to use point-in-time snapshots of the source server image using technologies such as volume shadow copy (VSS) on a Windows server. Depending upon the length of the migration process, the deployed image may be out of date and unusable by the time the initial migration has completed. The synchronization manager 1108 is responsible for synchronizing the source and target images after migration, quickly copying only the changes that have been made to the source image since the point-in-time capture from the source to the target. The example embodiment uses the Open Source rsync (http://rsync.samba.org/) application for performing synchronization between source and target. Those skilled in the art will recognize that there are many other ways to synchronize the servers.

The synchronization manager 1108 is also responsible for cutover, i.e., activating the new target server and deactivating the original source. The example embodiment implements cutover by fencing the target server—i.e., placing it on an isolated overlay network so that it will not interfere with the running source server—until the time of cutover. During cutover the source server is fenced and the target is moved onto the production overlay networks. Those skilled in the art will recognize that there are other methods for achieving cutover to the target server, such as by configuring it with a temporary network address for deployment and synchronization and then changing its network address to that of the source server after the source has been deactivated.

The Workload Migration Process

Turn next to FIG. 12 for a description of a migration process 1200. In the example embodiment as described herein, the workload migrater 110 as shown in FIG. 11 performs the actual migration of each individual workload. But it is unaware of the complex application, the relationships between workloads, and the virtual network environment. Accordingly, the migration manager ("MM") 101 performs all of the additional steps required such that the newly migrated server fits seamlessly into the complex application. FIG. 12 is a flow chart showing the entire migration or workload deployment process 1200 for a single workload that is part of a complex application. A deployment process may be viewed as having a capture half and a deploy (deployment) half Note that the capture half of the migration is not shown in the figure as no changes to the capture are necessary for migrating the complex application. Details of the capture for the example embodiment can be found in the Watt, et al. patent application referenced above.

Note that certain data items used in the workload deployment process are shown in FIG. 14, as stored in connection with an application map.

The deploy half of a migration begins with the MM 101 determining which overlay networks to connect the target server to and the method (see FIG. 6) to use within the target environment for connecting the server to those overlay networks. Note that the target server might be deployed using a different set of overlay networks than were used for the original source server. If the target server is being deployed to replace the original source server, then it is typically deployed to the same overlay networks as the source server. But if the target server is being deployed to a duplicate copy of the application, it will typically be deployed to a different set of overlay networks so that the source and target servers will not conflict.

The application map 1400 (see FIG. 14) contains a Node record 1450 describing every server that is part of the application and an ApplicationNetwork record 1409 describing every overlay network used by those servers. Each network interface on a server is defined by a NetworkInterface record 1465 within the Node 1450. The NetworkInterface 1465 includes an ApplicationNetworkID 1468 that points to the ApplicationNetwork 1409 to be associated with the interface. The OVNET_ID 1414 field in the ApplicationNetwork 1409 in points to the actual OverlayNetwork 940 that should be connected to the network interface.

Thus, to determine the proper configuration for the target server's network connections, the MM 101 first (step 1251) reads the source image configuration 1192 from the captured image data stored within the image library 190. It then (step 1252) reads the network map 900 for the hybrid cloud environment from the VNM's network mapper and the application map 1400 (see FIG. 14) from the application mapper 1301 (FIG. 13). The MM 101 identifies the overlay networks of the original source server (step 1253) by reading the source server's MAC address from the source image configuration 1192, using it to identify the Node record 1450 corresponding to the source server, and gathering the set of ApplicationNetworkIDs 1468 within the Node 1450. The MM 101 maps these to the desired set of overlay networks within the new target server environment (step 1254) by collecting the OVNET_ID 1414 fields from the ApplicationNetwork 1409 records pointed to by the ApplicationNetworkIDs. If the target server will be deployed while the source server is still active, the migration manager 101 may prepare two sets of overlay networks for the target server: a temporary set to be used for fencing the target server during deployment given by FenceOVNET_ID 1415, and the final production set to be used when the target is moved into actual production, OVNET_ID 1414.

From the network map 900 the MM 101 reads the NetworkDomain 910 record for the target server environment. For each overlay network ID identified in step 1254, there will be a LocalOverlayNetwork record 934 within the NetworkDomain 910 that describes how the overlay network is implemented within the target environment.

If the network domain for the target server uses local VLANs to isolate an overlay network 1255, the migration manager 101 prepares a deployment profile with the appropriate configuration settings for the target server at step 1256. If the target network domain uses tunnels to isolate an overlay network 1257, the migration manager creates a software installation package containing the tunnel client driver, configuration information, and tunnel key material to be used when deploying the target 1258. These are generated for the migration manager by the VNM's tunnel manager 803.

If the application map 1400 indicates that the workload is connected to a database 14100, either external to the workload or within the image itself, the migration manager checks the migration mode data MigrateMode 14102 (FIG. 14) for the database at step 1259. If it is an external database and in "leave behind" mode as determined at step 1260, there is nothing else to be done. Database access is being made using standard network protocols such as iSCSI or FCIP. The target server will be deployed with the same network address as the original source server, and the overlay networks will ensure that the target has access to the database.

If at step 1261 the database storage is external to the workload and in "external mirror" mode as indicated by the data item MigrateMode 14102, then the database is being migrated to a new physical location by some process external to the invention, such as LUN mirroring by a SAN device. The new copy of the database will have a new address in the target environment. This new address is provided by the TgtLocation 14104 field in the Database record 14100. The database address can take different forms depending upon the technology being used for storing the data: it could be a device name if it shows up as a local storage volume; it could be a network address (IP, fibre-channel, etc.) of an external storage volume. The migration manager adds the database address to the workload's deployment profile 1262 so that the address can be updated in the workload during the deploy process.

If the database MigrateMode 14102 is "sync mode" as determined at step 1263, then the database appears as a local storage volume to the source and target servers and will be migrated by the workload migrater 110. The migration manager 101 configures the workload's deployment profile (step 1264) to ensure that actual data within the database is synchronized between the source and target servers after the migration has completed. This ensures that the data on the target server is up to date before moving the target server into production.

With the target server's deployment profile now configured to account for any overlay networks and databases, the migration manager calls the workload migrater 110 at step 1265, passing it the deployment profile and any software installation packages. The workload migrater checks the specification for the target server 1266. If it is a virtual machine on a cloud or hypervisor infrastructure as determined at step 1267, it uses its infrastructure manager to create the target VM at step 1268 and to configure its virtual network interfaces such that they are placed on the proper local VLAN at step 1269. If the deployment profile specifies the use of an untagged VLAN to place the server on an overlay network at step 1270, the workload migrater 110 uses its infrastructure manager to configure the switch port connected to the server's interface 1271.

With the hardware and virtual hardware configuration set up correctly for any overlay networks, the workload migrater 110 proceeds with a standard workload migration as described in Watt, et al., as shown at step 1272. After this completes, the workload migrater 110 examines the deployment profile that it received from the migration manager 101. If the deployment profile specifies the use of a tagged VLAN to place the server on an overlay network as determined at step 1273, the workload migrater configures the server with a tagged network interface deploying the image 1274. If the workload migrater was called with a software installation package as determined at 1275, it installs this onto the server after deploying the image at step 1276. This may contain a tunnel client driver, configuration data and cryptographic key material so that the server will be connected to the network domain's VNA tunnel server for the overlay network. The target server is now fully configured and is rebooted at step 1277.

Optionally, after the target server reboots onto the migrated image, the migration manager 101 checks whether synchronization is required. If so, it triggers a synchronization operation from source to target at step 1278. The individual workload is now fully migrated. If this was part of a complex application, the migration manager 101 will coordinate multiple workload migrations and perform cutover when all have successfully completed.

The Image Library

While the real-time migration of a complex application from one set of servers to another is a common use case, the invention supports other use cases where the actual deployment of the application or one of its workloads occurs at some time after the images have been captured, for example, the recovery of a failed workload, disaster recovery, scaling one component of the complex application by adding additional copies of the workload, or cloning a copy of the application for testing or development purposes. As described in the incorporated Watt, et al. application, the image library 190 (FIG. 1) is used to store server images until they are needed. An image stored in the library can be deployed multiple times as needed.

The synchronization process used to synchronize the target server to the source after deployment can also be used with an image in the library, producing an incremental capture containing the changes to the source workload since the last full or incremental capture. When deploying a target server, the server can be restored to any point in time for which there is an incremental capture by first deploying the original captured image and then deploying each incremental capture in turn until reaching the desired recovery point. Additional operations that can be supported on incremental captures include consolidating multiple incremental captures into a single unit that contains all of the changes of the original captures, deleting capture points, etc. Incremental captures can also be taken that are based on the original full capture rather than the most recent incremental capture.

The image library 190 can be geographically distributed with storage located in or near a plurality of network domains throughout the hybrid cloud environment. Storing an image closest to where it will be deployed minimizes network lag and speeds up the deployment process. Storing multiple copies of an image in different network domains provides for redundancy.

The internal structure of the image library can be segmented by end user identity in order to provide secure multi-tenancy. To further improve security in a multi-tenant environment, images can be encrypted with a user-specific key while stored in the library.

The Migration Manager

The migration manager 101 is the central point of control for all operations concerning application migration. High level details are shown in FIG. 13. The example embodiment provides a user interface 102 that includes a graphical user interface (GUI), a command line interface (CLI), and an application programming interface (API) so that the features of application migration can be used by end users, administrators, and computer automation systems. Access to all of the interfaces is authenticated using a username and password. A user account database 1310 stores user authentication and authorization data, which is used to control access to the various network domains, overlay networks, and cloud and hypervisor infrastructures. In a multi-tenant installation, the user account data in the database 1310 also includes a user-specific network map, user-specific application maps, and a URI and authentication information for accessing a user-specific image library. Those skilled in the art will understand that authentication mechanisms other than passwords can be used to authenticate users, and that user account information can be stored using other mechanisms than a database, such as a file or directory service. And while this description of the example embodiment does not explicitly mention access control checks, those skilled in the art will understand that all access to user resources or the administrative features of the invention must be approved by an appropriate access control check that compares the user's identity, associated groups, and authorizations against the ownership and security settings of the resource being accessed.

The user interface 102 provides access to administrative functions, which include but are not limited to: the installation and configuration of the system; the configuration of the virtual network; managing users; managing application maps; specifying access control information to limit access to system resources such as virtual networks, applications, image libraries, and server resource pools. The user interface 102 also provides access for appropriately authorized non-administrative users to migration-related services that include but are not limited to defining an application, examining application resources, monitoring, capturing, migrating and deploying an application, cloning or scaling an application, recovering a failed workload for an application, and disaster recovery.

Still referring to FIG. 13, an application mapper 1301 monitors the servers and networks within the hybrid cloud environment and correlates their activity to provide application dependency mapping (ADM). By identifying which servers are communicating and which port numbers they are using, the ADM process identifies the complex applications that are running within the hybrid cloud resources. It identifies the workloads comprising each application and the network relationships between them. It stores this information in an application map database 1311 using a separate XML file for each complex application. Those skilled in the art will understand that other mechanisms and formats can be used to store the application map information.

The application mapper 1301 is primarily used for three purposes: 1) during the initial installation and configuration of the migration manager, the application manager is used to discover any pre-existing complex applications within the hybrid environment; 2) when adding a new network domain to the hybrid environment, the application manager is used to discover any new complex applications that have been added with the new domain; 3) the application manager is run periodically to detect any changes to the hybrid environment and the known applications. In the example embodiment, the application mapper is provided by a $3^{rd}$ party ADM product. One skilled in the art will understand that any ADM tool that provides the necessary mapping information can be used.

The application map database 1311 created by the application mapper 1301 stores data in files (not separately shown) describing complex applications that are currently running within the hybrid environment that were discovered by the application mapping process. The application map database 1311 files are also used to describe complex applications in many other states, such as when captured for disaster recovery, converted to a template for deploying a new copy of the application, or as a running application that has been created using a template. Application map database files in these other states are created by other parts of the system as part of the application migration process. Alternatively an end user can create, modify, or delete an application map using the user interface 102.

Still referring to FIG. 13, an application migrater 103 is responsible for capturing a complex application that has been defined by an application map. It uses an infrastructure manager 104 to access the configured migration manager 1312 in order to capture an image from each Node FIG. 14 1450 or NodePool 1426 defined by the application map. The application migrater 103 is also responsible for deploying a new copy of an application from the template of a previously captured application, and for migrating an application directly from a running application to a new set of resources. When deploying or migrating an application, the application migrater will use the infrastructure manager 104 to access the virtual network manager plugin 1313 in order to configure the virtual network for the new resources to which the application will be deployed, and the migration manager 1312 to deploy individual server images to those resources. As the capture, deploy, and migration of complex applications involves the coordinated steps from many components of the invention, a task sequencer 805 is used to sequence the operation through its many steps, to restart the operation in the event of a recoverable failure, and to recover from a failed operation. In addition to the capture/deploy/migration of entire complex applications, the migration manager 101 can perform operations on individual workloads comprising the application, such as adding additional workloads to a node farm, recovering a failed workload to a new resource, or moving a single workload to a new resource or different resource domain.

The Application Map

As shown in FIG. 14, an application map 1400 is used to describe a complex application. An application map comprises a number of different data elements, for example application data table (Application) 14150, an image library (ImageLibrary) 1416, image data (Image) 1485, node data (NodePool) 1426, node data (Node) 1450, server data (Server) 1474, and application network data (ApplicationNetwork) 1409. In the example embodiment each complex application is described by an application map that is stored as a separate XML file. One skilled in the art will recognize that the application map can be stored in many other formats such as a relational database, JSON, or other data communication and/or storage protocol.

Within the application map, the application record 14150 provides a unique description of the complex application. Each application record includes a unique ID 1401 and name 1402, a description, a parent ID 1408 used to identify the application, if any, from which this application is derived, and access control attributes 1404 controlling which end users can create, modify, manage, scale, or delete the application, create a template of the application, or deploy additional copies of the application.

The application's default placement instructions 1406 are used when migrating the application to new resources, scaling the resources of the application, or creating a copy of the application. The default placement includes a list of resource domains in which to deploy any new workloads.

The application's state 1405 information includes both a state value and a status value. The state value indicates the application's current operational state as shown in FIG. 17, which will be one of: discovering 1705 (the application mapper is monitoring the hybrid cloud environment and creating the initial application map); template 1720 (the map contains a template to be used in creating a copy of the application and does not refer to an actual production copy of the application); deploying 1745 (the system is in the process of deploying a copy of the application from the template); off 1750 (all resources for the application have been provisioned but are currently not running); booting 1730 (the system is in the process of bringing the application on line); fenced 1725 (all resources are powered on and are communicating on the alternate overlay networks); running 1710 (all resources are powered on and communicating on the primary overlay networks); scaling 1740 (the system is in the process scaling its capacity up or down by modifying the number of copies of a server image running within one or more of the node Pools of the application, where each node Pool consists of a set up servers deployed from the same source image); capturing 1715 (the system is in the process of capturing server images from one or more nodes of the application); shutting down 1735 (the system is in the process of powering off the application resources); and deleting 1755 (the system is in the process of terminating all resources used by the application). The allowed state transitions are also shown in FIG. 17.

The application status value in the State data 1405 indicates the application's current health or status, and will be one of: ok, warning, or error. When indicating a warning or error condition, additional information may be included to provide details about the specific warning or error.

The application's CaptureMode 1407 works in conjunction with the application node's CapturePriority 14110 to determine the order in which the servers used in a complex application will be captured. Servers are captured in order of increasing CapturePriority. If more than one server has the same priority, the CaptureMode determines whether the migration manager will capture an image from them in parallel for maximum speed or sequentially to reduce the impact upon the network resources both within the application and between the application and the image library.

A record in the ImageLibrary data 1416 specifies the location 1421 of the storage used to hold captured server images, the URI 1423 and credentials 1424 used to access the storage, and the access controls 1420 used to control access to the library.

A record in the Image data 1485 record records information about an image that has been captured from a server. It includes the image ID 1486 and name 1487, access controls 1489 for controlling access to the image, the ID of the image library 1490 in which the capture image data resides, the ID of the server from which it came 1491, the capture date 1492 and schedule for any recurring captures 1493, and the last synchronization date 1495 and synchronization schedule 1496 for any incremental updates. The synchronization options 1497 specify which portions of the image can be covered by the incremental update. Whether or not an image captured for a migration will be retained after the migration process completes is determined by the KeepPostMigrate 14111 flag in the node record 1450. If this is set true the migration manager will retain an image from the source server when performing a direct server-to-server migration.

A record in the Server data 1474 stores information about an actual deployed server that is part of the application. It contains the server ID 1475 and name 1476, and the access controls 1478 controlling which users can access, capture or migrate the server. The ResDomainID 1479 points to the resource domain record within the network map associated with the resource on which the server is running. The ServerSize 1480 includes the number of CPUs, number of cores, amount of memory, number and size of disk drives, etc. used for sizing the server capacity. The SourceImageID 1481 points to the image record from which the server was generated and the date/time 1482 at which it was deployed or last updated. If it was not created by the migration manager 101, these fields will be empty. The PrimaryMAC data item 1483 is used to uniquely identify the server when accessing other management systems, such as SNMP-based server monitoring tools.

Each record in the Node data 1450 record identifies one of the workloads comprising the complex application. When the data in an Application record 14150 refers to an actual deployed application, the node's ServerID field 1460 points to the server record associated with the server running the workload. When the data in an Application record 14150 refers to a template to be used in deploying an application, the node's SourceImageID field 1481 points to the image record from which to construct the server when deploying the application, and the ImageSyncDate field 1461 specifies which date to use when there is more than one image or incremental update available from the source server. The Placement field 1458 contains resource domain and server size information necessary for selecting an appropriate server resource for deploying the server. The DeployPriority field 1462 specifies the order in which the workloads should be deployed for the complex application. For example, it is usually necessary to deploy a database server before deploying an application server that needs access to the database.

The DeployProfile field 1463 is used to specify modifications to the server configuration when deploying the workload. For example, if a database has been migrated using LUN replication, this might specify the new location of the database. A node record 1450 may also include a plurality of NetworkInterface subrecords 1465 that specify how to configure the network interfaces on the deployed server. The boot protocol 1469, IP address 1470, network mask 1471, gateway 1472, etc. will be taken directly from the source server or source image when the workload is being deployed as a migration to replace the original source application. When deploying a second copy of an application, these values may be changed to avoid network conflicts—or the address can be kept the same and the network interface placed on a different overlay network.

Still referring to a NetworkInterface subrecord 1465 in FIG. 14, a network interface's ApplicationNetworkID 1468 field controls the overlay network to which the interface is connected. This points to an ApplicationNetwork record 1409, that in turn points to two OverlayNetwork data items, e.g. 1414 and 1415. The OVNET_ID field 1414 points to the production overlay network to which the interface should be connected when the application is fully deployed and placed into production. The FenceOVNET_ID field 1415 is optionally supplied to specify an alternate overlay network to which the interface should be connected prior to going live. This effectively fences the interface from the original source server so they will not conflict if using the same IP address.

When a complex application requires more than one copy of a workload—for example, it uses a pool of web servers to better handle high volume traffic—a NodePool record 1426 is used to identify the pool of related servers and provide the template from which to build additional copies. A NodePool record 1426 works as a template: its SourceImageID 1435, ImageSyncDate 1436, Placement 1433, DeployPriority 1437 and DeployProfile 1438 fields are the same as a Node record. The PrimeNodeID field 1434 specifies the node from which to copy the server image during a capture of migrate operation. The MinNodes field 1439 and MaxNodes field 1440 specify the minimum and maximum number of nodes that can be deployed and running for the application.

The NetworkInterface data comprises subrecords 1441 for the NodePool data 1426 are different than those for the Node in that they do not specify IP address information. Rather if BootProto 1444 specifies static addressing, the IPAddressRange specifies a range of addresses 1445 from which it should allocate a new address when deploying a server. All Nodes that are associated with a NodePool set their NodePoolID 1456 to point to the controlling NodePool record.

The records within an application map 1400 will be linked in different ways depending upon the state of the application. FIG. 15 shows a set of application maps 1400 in block diagram form as they might be seen in several varied stages or operations, for example as discovered by an application mapper 1301 (FIG. 13) of the migration manager 101, using a node pool, and after application capture. It will be understood that the data representing the application map will take the form 1400 as discussed above in connection with FIG. 14, after the operations as will be described.

FIG. 15A shows an application map 1400a created by the application mapper 1301 of the migration manager 101 (FIG. 13) for a newly discovered application within the virtual network environment. This application will be in the discovering state 1705 (FIG. 17) while the application mapper is working, and then the running state 1710 when it has finished. Any workloads discovered by the application mapper will be pre-existing—that is they were deployed by something other than the migration manager 101. The map 1400*a* shown in FIG. 15A corresponds to the example of FIG. 2, with the addition of a second Web Server. In this example, the application mapper 1301 discovered four servers: Webserver1, Webserver2, AppServer, and DBServer. Thus it created four server records, 1510-1513. It created four matching node records 1502-1505 in the form of Node record 1450 and linked them to the discovered servers. It detected the servers communicating on three separate application networks 1515-1517. It created ApplicationNetwork records 1409 for these networks, linked them to the Node records, and linked them to OverlayNetwork records 940.

In some embodiments, the application mapper 1301 may not detect that the two web servers 1510-1511 (which are independent nodes on the network) are clones. Thus, FIG. 15B shows an application map 1400*b* created by the user editing the original application map (e.g. 1400*a*) using the Migration Manager user interface 102. A NodePool 1520 record is created and the two nodes are linked to it. The NodePool's PrimeNodeID is set to WebServer1. It will be appreciated that the addition and use of the NodePool record allows the system to automatically scale the application's web server capacity.

FIG. 15C illustrates an application map 1400*c* after the application has been captured. Server images are captured from the AppServer 1526 and DB Server 1527 and linked to the corresponding Node records. A single image is captured from WebServer1 1525 and linked to the NodePool. An image is not needed for WebServer2 as it can be recreated using the image from WebServer1.

FIG. 16 illustrates application maps 1400*d*, 1400*e* converted to a template, and deployed from a template, respectively.

FIG. 16A shows an application map 1400*d* converted to a template for deploying a copy of a complex application. The original server records are removed from the map, leaving the server images. The Placement fields are specified for the NodePool and the two independent nodes 1504-1505, providing the target resource domain in which to deploy the workloads as well as the server size data to use in allocating the server resource. This information can be provided by the user via the user interface 102. If not provided, the migration manager 101 will automatically select the target server size to match the original source server.

FIG. 16B shows an application map 1400*e* after deploying a copy of a complex application. A single web server was deployed, so there are now three server records. A new AppServer 1611 and DBServer 1612 are linked their respective nodes. A single web server 1610 is linked to a new node 1605, which is in turn linked to the NodePool 1520. All server records link back to their source image.

As discussed above, FIG. 17 illustrates an application state diagram, which was discussed above and need not be described further here.

The Application Migration Process

FIG. 18 shows a flow chart of an application migration process 1800, which in the current exemplary embodiment comprises an installation process 1810, a network configuration process 1820, an application configuration process 1830, and an application migration process 1840.

The installation process 1810 starts at step 1811 with the installation and configuration of the migration manager 101, workload migrater 110, virtual network manager 115, and configuration of the image library 190. The image library 190 is configured at step 1812. This includes allocating storage, setting up access controls, and otherwise configuring the network storage device so that it is accessible by the other components of the system. Prior to deploying the primary VNA, any firewall or security device protecting the primary network domain must be configured to allow incoming tunnel connections to the primary VNA, as shown at step 1813. An administrative user now logs into the migration manager UI and specifies the configuration of the primary network domain, which includes identifying the resource domains that can be used for deploying servers. Once the resource domains have been defined, the migration manager can deploy the primary VNA at step 1814. When first run, the VNA will run its discovery process at step 1815 on the primary network domain, discovering its VLANs, subnets, and servers.

After the primary VNA has been deployed at step 1814, the installation process 1810 continues with the configuration of the virtual network by a network configuration process 1820. The administrator specifies the necessary network domains at step 1821 that define the hybrid cloud environment, deploying the necessary remote VNAs at step 1822, configuring the overlay networks at step 1825, and then deploying the overlay networks at step 1826. The last step is shown in full detail in FIG. 10.

The application configuration process 1830 begins by running the application mapper to discover the applications currently running within the hybrid environment and create an initial set of application maps 1400 similar to FIG. 15A. The resulting application map should be examined by the end user. Depending upon the accuracy of the mapping tool, it might be necessary to add or remove nodes from the map, or to consolidate multiple nodes into a node pool, as shown at step 1832.

Also at step 1833, the user should then examine the application networks data (ApplicationNetwork) 1409 defined in the application map. Rather than directly show each node's connections to the globally defined overlay networks, the mapping tools creates a set of application network records 1409. The node interfaces are then mapped to the application networks using their ApplicationNetworkID data 1468, which are then mapped to the currently used overlay network data 1414. This allows the user to easily specify the use of alternate networks when deploying the application, whether to safely deploy an additional copy of the application without interfering with the original copy, or to specify a set of networks to use for temporarily fencing the application after initial deployment.

The final step of the application configuration process 1830, prior to starting the application migration process 1840, is to specify the placement data for the deployed application at step 1834 using the application's placement record 1406. This specifies a list of one or more resource domains in which to deploy the application. Without further instruction, the migration manager will attempt to deploy all of the application workloads into a single resource domain, and will search the supplied list of domains for one with sufficient resources. The servers chosen (or created) for deployment will be sized to match the original source servers. Each node and node pool have an additional placement fields (1458 and 1433 respectively) that override the application placement instructions. These placement records include both a list of target resource domains as well as required server size data. This allows an individual node to be deployed to a separate set of resources or to be scaled up/down in capacity.

With the placement data specified, the application migration process 1840 can begin. The first step is to install the capture agent 1131 onto the source servers at step 1841. The procedure for doing this depends upon the selection of workload migrater. In the example embodiment, agent installation can be automated if the node's administrative credentials are made available to the migration manager. Otherwise the agents can be installed by some other means, such as manual installation or the use of a software patch manager.

With the agents installed, the source servers are ready for capture. The capture process can be sequenced using the node's CapturePriority 14110 if it is necessary to ensure that images are captured in a specific order. Images can be captured in parallel at step 1843 if there is sufficient bandwidth between the servers and the image library. This provides the fastest migration. Otherwise the images can be capture sequentially at step 1844 to minimize the load placed on the network and storage infrastructures.

After all images have been captured, they are deployed out to the target resources specified by the placement data. The deployments are performed in a prioritized manner at step 1845 to ensure that the workloads become available in the correct order to meet any application dependencies. The detailed deployment process for an individual workload is shown in FIG. 12.

After all workloads have been deployed, the migration manager 101 waits until all the new servers are running at step 1848. The migration manager can tell when a deployed server is up and running because the capture agent on the original source server is migrated to the target, and the new server thus appears in the set of servers visible to the migration manager. Using the application's optional verification script 14130, the migration manager waits for the application to become available. The verification script is custom to the complex application. It exercises enough of the application's functionality to ensure that the application and all of its associated workloads are functioning correctly. Verifying the operation of a complex operation can be a difficult chore—often more than can be handled by a single script. Thus the migration manager can optionally check with the user for final verification.

After the application has been verified, if automated cutover has been specified at step 1850, the migration manager contacts the capture agents on all source servers to switch the servers onto alternate overlay networks 1851, making them inaccessible for production use. It then immediately contacts the capture agents on the newly deployed servers to switch the servers from the fenced to the production overlay networks at step 1852, making them accessible for production use. The original source servers are left running on the fenced networks in case there is a need to revert back to the original servers.

If only a portion of the workloads comprising the application were marked for migration, then only those servers will be swapped into production. The resulting application will then run with some workloads on their original servers and some on newly deployed servers. The application will continue to function as it did with the original servers because the newly deployed servers, wherever they reside, are using the same network addresses as the original servers that they replaced, and are connected to the remaining original servers via the overlay networks Accessing Protected Subnets Many corporate and public cloud data center environments enhance security by isolating some network segments so that a server connected to the isolated network cannot be accessed from an external network, and cannot itself access an external network. In order for invention system constructed as described herein to function on such isolated networks, they must be tied into a virtual overlay network using a VNA that has access to both the isolated network and an external network on which it can establish tunnel connections to other VNAs. One approach for handling isolated environments is to create a special "provisioning" overlay network. The capture and deploy agents can connect to the provisioning network for the duration of migration tasks, and the workload can remain isolated during normal operation.

From the foregoing, it will be understood that various aspects of the processes described herein are software processes that execute on computer systems that form parts of the system 100. Accordingly, it will be understood that various embodiments of the system described herein are generally implemented as specially configured computers including various computer hardware as discussed in greater detail below. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, the embodiments of the claimed inventions are described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A computer-implemented method of migrating a complex computer application from an initial application configuration comprising a plurality of source servers within a hybrid cloud environment to a migrated application configuration comprising a plurality of target servers within the same hybrid cloud environment, the hybrid cloud environment comprising a plurality of data center environments that are connected for electronic communications, each data center environment comprising at least one resource pool of server resources comprising a plurality of physical or virtual machines that implement servers and are connected for electronic communications among each other via physical or virtual data communication networks, the initial application configuration being implemented via a plurality workloads executing on a plurality of source servers operating within one or more of the data center environments, comprising the steps of:

providing a network map storing data associated with the data center environments and their associated data communication networks and network interfaces, the network map defining the data center environments that comprise the hybrid cloud environment, resource pools within each data center environment, virtual network appliances deployed into data center environments, and overlay networks that connect the data center environments for electronic communications;

providing an application map storing data associated with an initial application configuration of the complex computer application, the application map defining the workloads that comprise the complex application, network connections between the workloads, and the overlay networks used to create network connections;

receiving an application migration request for a migration of the complex computer application to a migrated application configuration, the migrated application configuration specifying which of the source servers to migrate and the data center environments to be employed for the target servers;

in response to the application migration request, accessing the network map to identify the resource pools and network configuration available at each data center environment identified in the application migration request;

deploying a new virtual network appliance at each data center environment included in the migrated application configuration that does not already include a virtual network appliance;

installing, if not already present, the overlay networks required by the migrated application configuration onto the virtual network appliances within the data center environments identified by the migrated application configuration;

in further response to the migration request, accessing the application map to identify the workloads of the initial application configuration that are to be migrated to the migrated application configuration, the workloads including workloads required for any virtual network appliances used in the migrated application configuration;

in further response to the migration request, assigning, to each identified workload, at least one server resource to be used as a target server from the server resource pools available in the data center environments identified in the migrated application configuration;

migrating each workload of the application from its source server to its new assigned target server;

connecting each network interface on each new assigned target server to the overlay network specified in the application map;

updating the application map and network map to reflect characteristics of the migrated application configuration; and commencing execution of the assigned target servers in the migrated application configuration to run the complex computer application.

2. The method of claim 1, wherein the migration request identifies specific resource pools within a data center environment to be used for identifying target servers.

3. The method of claim 1, wherein the steps are carried out by a migration manager server, a workload migrater server, and a virtual network manager server.

4. The method of claim 1, wherein the application migration request is initially received at a migration manager server as an input from a user via a user interface.

5. The method of claim 1, wherein the step of migrating the workloads is effected by a workload migrater server.

6. The method of claim 1, wherein each overlay network comprises one or more network segments within each of the data center environments that are connected for electronic communications by the virtual network appliances.

7. The method of claim 6, wherein a network segment connected by the virtual network appliance to the overlay network comprises a physically isolated network segment such as an Ethernet local area network run on dedicated switching hardware.

8. The method of claim 6, wherein a network segment connected by a virtual network appliance to an overlay network comprises logically isolated traffic using VLAN tagging such as IEEE 802.1Q on shared switching hardware.

9. The method of claim 6, wherein a network segment connected by a virtual network appliance to an overlay network comprises an encrypted network tunnel to an individual server acting as part of a complex application.

10. The method of claim 6, wherein a network segment connected by a virtual network appliance to an overlay network comprises an encrypted network tunnel to another virtual network appliance.

11. The method of claim 1, wherein virtual network appliances effect one or more overlay networks spanning one or more data center environments using encrypted network tunnels to bridge traffic between the virtual network appliances.

12. The method of claim 11, wherein an encrypted tunnel is implemented using a connection-oriented network protocol such as TCP.

13. The method of claim 11, wherein an encrypted tunnel is implemented using a connectionless-oriented network protocol such as UDP.

14. The method of 11, wherein the tunneling protocol of an encrypted tunnel is one of OpenVPN, PPTP, L2TP, VXLAN, NVGRE, STT or NVO3.

15. The method of claim 1, wherein the virtual network manager can automatically create a hybrid cloud environment by using the workload migrater to deploy virtual network appliances into a data center environment.

16. The method of claim 1, wherein the steps of deploying new virtual network appliances and installing overlay networks is effected by a virtual network manager server.

17. The method of claim 16, wherein the virtual network manager automatically deploys a virtual network appliance that is specified in the network map but not yet deployed.

18. The method of claim 16, wherein the virtual network manager automatically removes or inactivates a virtual network appliance that is currently active but no longer specified in the network map.

19. The method of claim 16, wherein the virtual network manager automatically configures a virtual network appliance for an overlay network if the appliance is not configured for the network but should be according to the network map.

20. The method of claim 16, wherein the virtual network manager automatically removes the configuration for an overlay network from a virtual network appliance if the appliance is currently configured for the network but should not be according the network map.

21. The method of claim 1, wherein connections between virtual network appliances are provided in a star topology to reduce the potential for routing loops.

22. The method of claim 1, further comprising the step of optimizing traffic on an overlay network used in the migrated application configuration by changing the secure tunnel connections between virtual network appliances.

23. The method of claim 22, wherein an optimized topology of tunnel connections between virtual network appliances is effected by monitoring the traffic on the tunnel connections.

24. The method of claim 22, further comprising the step of periodically updating the connections between virtual network appliances based upon a newly determined optimal topology.

25. The method of claim 1, wherein an application map is provided as part of the application migration request.

26. The method of claim 1, wherein an application map is obtained by retrieving a previously saved copy in a file or database.

27. The method of claim 1, wherein a network map is provided as part of the application migration request.

28. The method of claim 1, wherein the network map is retrieved from a previously saved copy in a file or database.

29. The method of claim 1, wherein a workload is connected to an overlay network by installing a tunnel driver, if not already present in the workload, and then configuring the tunnel driver to connect to a tunnel server running on a virtual network appliance that corresponds to the specified overlay network.

30. The method of claim 1, wherein a workload is connected to an overlay network by configuring it with a tagged VLAN interface using the VLAN ID assigned to the overlay network within the workload's data center environment.

31. The method of claim 1, wherein a workload is connected to an overlay network by configuring a network switch port to which it is connected to enforce untagged VLAN access using the VLAN ID assigned to the overlay network within the workload's data center environment.

32. The method of claim 31, wherein the network switch port is a physical port on a physical network switch.

33. The method of claim 31, wherein the network switch port is a virtual port on a virtual network switch running within a hypervisor host or cloud infrastructure.

34. The method of claim 1, wherein target servers are placed onto the same set of overlay networks as the original source servers so that they can immediately replace the source servers.

35. The method of claim 1, wherein target servers are placed onto a different set of overlay networks than the original source servers to minimize risk of network conflicts.

36. The method of claim 1, wherein a complete copy of a complex application is made by migrating a copy of the application to an alternate set of overlay networks.

37. The method of claim 1, wherein target servers are moved into production mode by switching their set of overlay networks to that of the original source servers after first either shutting down the source servers or switching them to an alternate set of overlay networks.

38. The method of claim 1, wherein the server resource pool is provided by one or more of the group comprising: one or more physical servers, one or more virtualization hosts, a private cloud infrastructure, a public cloud infrastructure.

39. The method of claim 1, wherein a virtual network appliance is implemented by one of more of the group comprising: as a workload running on a physical server, a workload running on a virtual server on a hypervisor host or cloud infrastructure, a virtual network switch plug-in on a hypervisor host or cloud infrastructure, a software module running on a physical network switch.

40. The method of claim 1, wherein the initial application configuration is created automatically using an application dependency mapping tool.

41. The method of claim 1, wherein the network map is created automatically using a network discovery tool.

42. The method of claim 1, wherein a workload is migrated directly from a source server to a target server.

43. The method of claim 1, further comprising the step of providing an image library for storing images of source servers.

44. The method of claim 43, wherein a source server image is captured and stored in the image library prior to a migration operation.

45. The method of claim 43, wherein a target server is configured from an image that is stored in the image library.

46. The method of claim 43, wherein a workload is migrated by capturing a source server image to the image library prior to a migration request, and then deploying the captured mage to a target server.

47. The method of claim 43, further comprising the step of restoring a failed individual workload that is part of a complex application by deploying a replacement for the failed workload using an image stored in the image library.

48. The method of claim 47, wherein an entire failed complex application is restored by deploying replacement workloads for each failed workload using images stored in the image library.

49. The method of claim 43, further comprising the step of scaling a component of a complex application by deploying additional copies of the component's workload using an image stored in the image library.

50. The method of claim 1, wherein at least one, but not all, of the source servers are migrated to a different data center environment and the entire application continues to function because the overlay networks allow the servers that were migrated and the servers that were not migrated to communicate with each other as they did prior to the migration.

51. A computer-implemented method of migrating a complex computer application from an initial application configuration comprising a plurality of source servers within a hybrid cloud environment to a migrated application configuration comprising a plurality of target servers within the same hybrid cloud environment, the hybrid cloud environment comprising a plurality of data center environments that include a resource pool of server resources comprising a plurality of virtual or physical machines that implement servers and are connected for electronic communications among each other via physical or virtual data communication networks, the initial application configuration being implemented via a plurality of source servers operating within one or more of the data center environments, comprising the steps of:

provifing a virtual network appliance (VNA) at each data center environment for effecting one or more overlay networks to be used for coupling servers that implement the complex computer application in the migrated application configuration;

providing an electronically accessible network map storing information (a) corresponding to each data center environment and its associated data communication networks and network interfaces, (b) identifying the resource pools in each data center environments that are available to provide server resources that can be assigned as target servers for a migration operation, (c) identifying attributes of the virtual network appliances (VNAs) deployed within the data center environments, and (d) the overlay networks that connect the data center environments for electronic communication;

providing an electronically accessible application map storing (a) information defining one or more workloads that, together with one or more other workloads, constitute the complex computer application in an initial application configuration; (b) network connection data defining the network connections between the workloads of the complex computer application in the initial application configuration; and (c) the overlay networks used to create the network connections between the workloads of the complex application;

receiving a migration request via user input at a computer-implemented migration system, the migration request including an identification of the source servers of the application to be migrated to target servers and an identification of the data center environments, and, optionally, specific resource pools within those data center environments, to be used for providing the target servers;

in response to the migration request at the migration system, accessing the application map to identify the workloads associated with the application, the network connections between the workloads; and the overlay networks used by the network connections;

in further response to the migration request at the migration system, accessing the network map to (a) select one or more server resources from the resource pools of the identified data center environments for assignment as one or more target servers for a migrated application configuration, and (b) retrieve network connection data specifying how to deploy the overlay networks required by the migrated application configuration into the identified data center environments;

in further response to the migration request at the migration system, deploying overlay networks for the target servers;

updating the network map to reflect any newly deployed overlay networks;

updating the application map to reflect the identification of selected target servers assigned for the migration application configuration and any configuration required to connect the selected target servers to the overlay networks;

migrating each source server to a corresponding assigned target server within the identified data center environment;

configuring each target server to access the overlay networks indicated by the migrated application configuration; and initiating the operations of the VNAs, overlay networks assigned for the migrated application configuration, and target servers assigned for the migration application configuration such that the application thereafter executes in the migrated application configuration.

52. The method of claim 51, wherein each source server in the initial application configuration is represented by a source server image that is stored in an image library, and wherein the step of migrating each source server to a corresponding assigned target server comprises accessing the source server image of the source server in the image library and utilizing the data in the source server image to configure the corresponding target server.

53. The method of claim 51, wherein the migration system comprises a migration manager server, a workload manager server, and a virtual network manager server.

\* \* \* \* \*